US012126071B2

(12) United States Patent
Yeon et al.

(10) Patent No.: US 12,126,071 B2
(45) Date of Patent: Oct. 22, 2024

(54) MULTI-DIRECTIONAL ANTENNA MODULES EMPLOYING A SURFACE-MOUNT ANTENNA(S) TO SUPPORT ANTENNA PATTERN MULTI-DIRECTIONALITY, AND RELATED FABRICATION METHODS

(71) Applicant: QUALCOMM Incorporated, San Diego, CA (US)

(72) Inventors: Jaehyun Yeon, San Diego, CA (US); Kun Fang, San Diego, CA (US); Suhyung Hwang, Rancho Mission Viejo, CA (US); Hyunchul Cho, Suwon (KR)

(73) Assignee: QUALCOMM INCORPORATED, San Diego, CA (US)

( * ) Notice: Subject to any disclaimer, the term of this patent is extended or adjusted under 35 U.S.C. 154(b) by 129 days.

(21) Appl. No.: 17/653,061

(22) Filed: Mar. 1, 2022

(65) Prior Publication Data

US 2023/0282959 A1 Sep. 7, 2023

(51) Int. Cl.
*H01Q 1/22* (2006.01)
*H01Q 9/04* (2006.01)
(Continued)

(52) U.S. Cl.
CPC ......... *H01Q 1/2283* (2013.01); *H01Q 9/0414* (2013.01); *H01Q 21/08* (2013.01); *H01Q 23/00* (2013.01)

(58) Field of Classification Search
CPC .... H01Q 1/2283; H01Q 9/0414; H01Q 21/08; H01Q 21/28; H01Q 23/00
See application file for complete search history.

(56) References Cited

U.S. PATENT DOCUMENTS

2019/0190120 A1* 6/2019 Kim .................... H01Q 9/0457
2019/0252784 A1 8/2019 Ueda
(Continued)

OTHER PUBLICATIONS

International Search Report and Written Opinion for International Patent Application No. PCT/US2023/062623, mailed Jun. 7, 2023, 17 pages.

*Primary Examiner* — Dameon E Levi
*Assistant Examiner* — Leah Rosenberg
(74) *Attorney, Agent, or Firm* — Withrow & Terranova, PLLC

(57) ABSTRACT

Multi-directional antenna modules employing a surface-mount antenna(s) to support antenna pattern mufti-directionality, and related fabrication methods. The antenna module includes a radio-frequency (RF) IC (RFIC) package that includes one or more RFICs for supporting RF communications and a package substrate that includes one or more metallization layers with formed metal interconnects for routing of signals between the RFICs and multiple antennas in the package substrate. To provide multi-directionality in antenna radiation patterns, a first antenna is provided that is coupled to the package substrate and oriented in a first plane, and a second antenna is provided that coupled to the package substrate and oriented in a second plane orthogonal to the first plane. In an example, the second antenna is packaged in an antenna package that includes external metal pads that when surface mounted to the package substrate, cause the second antenna to oriented in the second plane.

21 Claims, 11 Drawing Sheets

(51) Int. Cl.
*H01Q 21/08* (2006.01)
*H01Q 23/00* (2006.01)

(56) References Cited

U.S. PATENT DOCUMENTS

| | | | | |
|---|---|---|---|---|
| 2020/0021015 | A1* | 1/2020 | Yun | H01Q 1/2283 |
| 2020/0028238 | A1* | 1/2020 | Park | H01Q 1/38 |
| 2020/0091581 | A1* | 3/2020 | Ou | H01Q 21/065 |
| 2020/0169007 | A1 | 5/2020 | Song et al. | |
| 2020/0194893 | A1* | 6/2020 | Im | H01L 23/66 |
| 2020/0266519 | A1* | 8/2020 | Lee | H01Q 1/38 |
| 2020/0313305 | A1* | 10/2020 | Yang | H01Q 21/065 |
| 2020/0328530 | A1 | 10/2020 | Park et al. | |
| 2021/0044001 | A1* | 2/2021 | Kang | H01Q 1/38 |
| 2021/0051797 | A1 | 2/2021 | Han | |
| 2021/0083380 | A1* | 3/2021 | Takayama | H01Q 5/28 |
| 2021/0119344 | A1* | 4/2021 | Nemoto | H01Q 21/205 |
| 2021/0151874 | A1* | 5/2021 | Sudo | H01Q 1/523 |
| 2021/0280959 | A1* | 9/2021 | Han | H01Q 1/36 |
| 2021/0345492 | A1* | 11/2021 | Yeon | H05K 1/189 |
| 2021/0376493 | A1* | 12/2021 | Shah | H01Q 1/38 |
| 2021/0410274 | A1* | 12/2021 | Han | H01Q 1/2283 |
| 2022/0085508 | A1* | 3/2022 | Kobuke | H01Q 1/38 |
| 2022/0336967 | A1* | 10/2022 | Park | H01Q 1/46 |

* cited by examiner

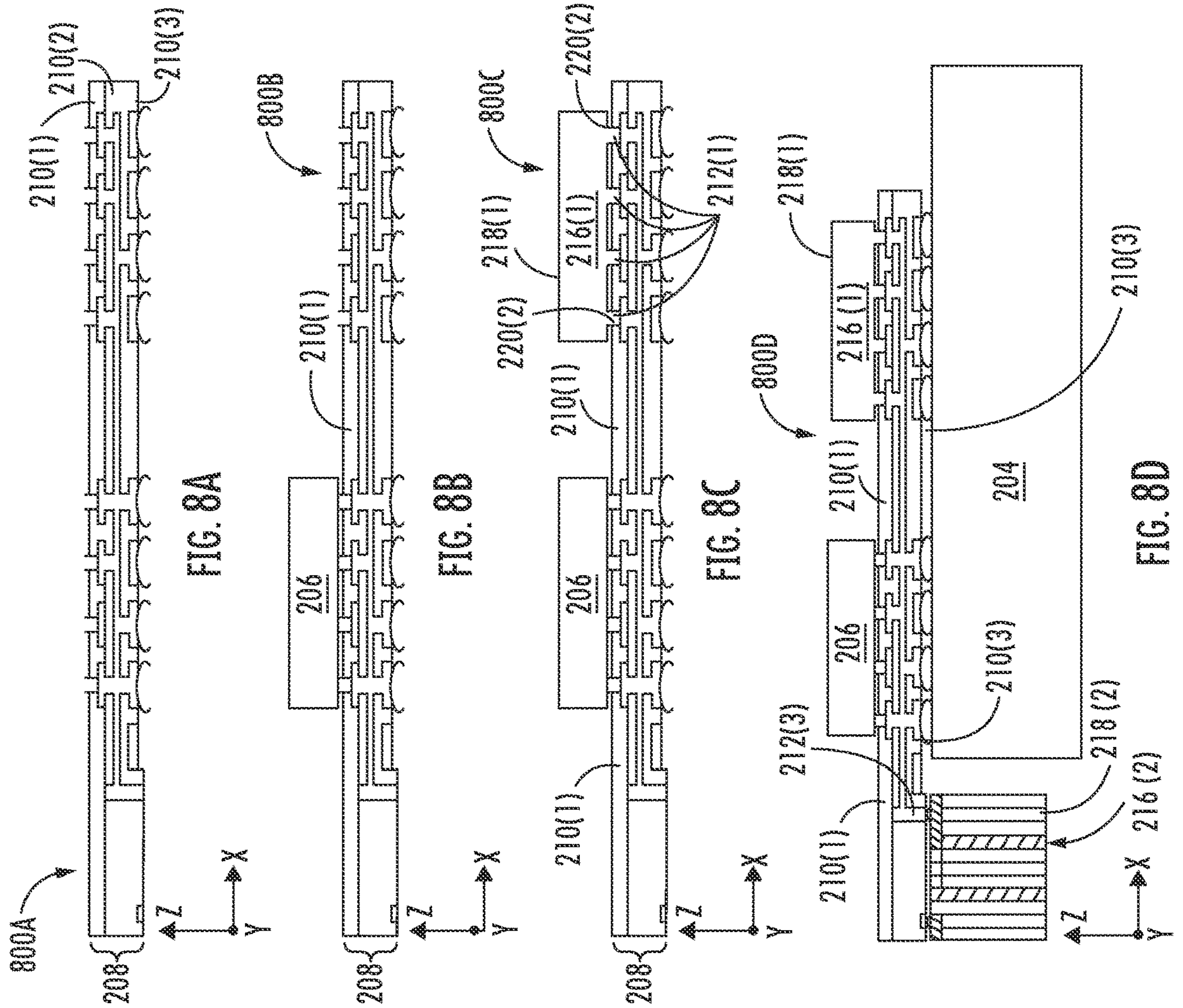
FIG. 8A
FIG. 8B
FIG. 8C
FIG. 8D
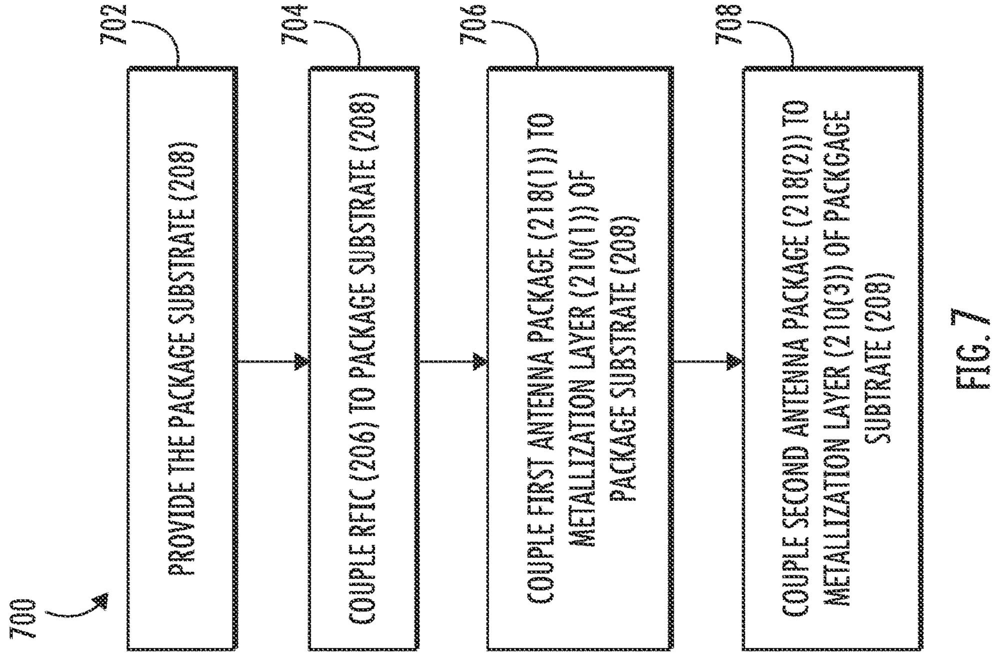
FIG. 7

MULTI-DIRECTIONAL ANTENNA MODULES EMPLOYING A SURFACE-MOUNT ANTENNA(S) TO SUPPORT ANTENNA PATTERN MULTI-DIRECTIONALITY, AND RELATED FABRICATION METHODS

BACKGROUND

Field of the Disclosure

The field of the disclosure relates to antenna modules (also referred to as "antenna-in-packages" (AiP(s)) that include a radio-frequency (RF) integrated circuit (IC) (RFIC) coupled to an antennas) through a package substrate.

Background

Modern smart phones and other portable devices have extended the use of different wireless links with a variety of technologies in different radio frequency bands. For example, fifth generation (5G) cellular networks, commonly referred to as 5G new radio (NR), include frequencies in the range of 24.25 to 86 Gigahertz (GHz), with the lower 19.25 GHz (24.25-43.5 GHz) more likely to be used for mobile devices. This frequency spectrum of 5G communications is in the range of millimeter wave (mmWave) or millimeter band. mmWave enables higher data rates than at lower frequencies, such as those used for Wi-Fi and current cellular networks.

Radio-frequency (RF) transceivers that support mmWave spectrum are incorporated into mobile and other portable devices that are designed to support mmWave communications signals. To support the integration of a RF transceiver in a device, the RF transceiver can be integrated in an RF integrated circuit (IC) (RFIC) that is provided as part of an antenna module. The RFIC is realized in a RFIC semiconductor die ("die"). An antenna module may also be referred to as an "antenna-in-package" (AiP). A conventional antenna module includes a RFIC package that includes one or more RFICs, a power management IC (PMIC), and passive electrical components (e.g., inductors, capacitors, etc.) mounted to one side of a package substrate as a support structure. The package substrate supports metallization structures to provide chip-to-chip and external signal interfaces to the RFIC package. The package substrate also includes one or more antennas that are electrically coupled to the RFIC package through the metallization structures of the package substrate to be capable of receiving and radiating electrical RF signals as electromagnetic (EM) signals. The package substrate may include a plurality of antennas, also referred to an antenna array, to provide a signal coverage in a desired, larger area around the antenna module.

It may be desired to minimize the area consumed by antennas in an antenna module to reduce the overall size of the antenna module. However, the antenna module also needs to have a sufficient radiation pattern to achieve the desired RF performance depending on the desired application. In this regard, a patch antenna is a low profile antenna that can be employed in an antenna module. Also, if the antenna module is designed to support multiple input, multiple output (MEM) communication applications, further additional antennas are provided in the antenna module to support the multiple MIMO signal streams, but at the cost of increasing the size of the antenna module.

SUMMARY OF THE DISCLOSURE

Aspects disclosed in the detailed description include multi-directional antenna modules employing a surface-mount antenna(s) to support antenna pattern multi-directionality. Related fabrication methods are also disclosed. The antenna module is designed be mounted and coupled to an application circuit board of an electronic device (e.g., a millimeter (mm) Wave communications device) to provide an RF communication capability for the electronic device. The antenna module includes a radio-frequency (RF) IC (RFIC) package that includes one or more RFICs for supporting RF signal transmission and reception. The antenna module also includes a package substrate that includes one or more metallization layers each disposed in a respective first plane (e.g. horizontal plane) and each having metal interconnects for routing of signals between the RFIC(s) and an antennas) coupled to the package substrate. In an exemplary aspect, a first antenna (e.g., a first patch antenna) is coupled to the package substrate and electrically coupled to an RFIC(s) through the package substrate to provide a first antenna. The antenna element(s) of the first antenna are disposed in a second plane (e.g. horizontal plane) parallel to package substrate such that the first antenna has a first antenna radiation pattern in a first direction (e.g., vertical direction) generally orthogonal to the package substrate. To provide additional antenna radiation pattern directionality, the antenna module also includes a second antenna (e.g., a second patch antenna) that is coupled to the package substrate such that its antenna element(s) is disposed in a third plane (e.g. vertical plane) oriented orthogonal to the package substrate. In this manner, the second antenna has a second antenna radiation pattern in a second direction (e.g. horizontal direction) orthogonal to the first direction (e.g., vertical direction) of the first antenna radiation pattern of the first antenna. Thus, the second antenna being coupled to the package substrate such that the orientation of its antenna element(s) is orthogonal to the orientation of the first antenna provides multi-directionality of antenna radiation patterns for the antenna module.

In exemplary aspects, the package substrate of the antenna module does not have to be flexible and bent as the method of orienting the first and second antennas in orthogonal planes to each other to achieve multi-directional antenna radiation patterns. In exemplary aspects, the package substrate of the antenna module is unbent such that its metallization layers extend in parallel planes in the same directions. The first antenna is packaged such that its first antenna element(s) is oriented in the second plane(s) (e.g., horizontal plane(s)) when the first antenna is coupled a metallization layer in the package substrate. The second antenna is packaged such that its second antenna element(s) is oriented in the third (e.g., vertical) plane(s) when the second antenna is coupled to a metallization layer in the package substrate. In this manner, the first and second antennas are packaged such they are automatically oriented to be orthogonal to each other when coupled to the package substrate, Thus, the respective first and second antenna radiation patterns of the first and second antennas are in the respective first and second directions generally orthogonal to each other to provide multi-directionality of antenna radiation patterns in the antenna module. The antenna performance of the second antenna can be tuned in design by controlling the size of the second antenna element(s). In the case of the second antenna including multiple second antenna elements separated by a dielectric and configured to electro-magnetically (EM) couple to each other, the distance between the multiple second antenna elements can be tuned in design to control antenna performance of the second antenna.

As a non-limiting example, the antenna elements(s) of the first and second antennas of the antenna module may be patch antennas that each include one or more respective metal patches as their antenna elements. In this example, the first antenna is packaged in a first antenna package such that a first metal patch(es) of the first antenna is oriented in the second (e.g., horizontal plane(s)) parallel to the package substrate when the first antenna package is coupled to the package substrate. Also in this example, the second antenna is packaged in a second antenna package such that a second metal patch(es) of the second antenna is oriented in the second (e.g., horizontal plane(s)) parallel to the package substrate when the second antenna package is coupled to the package substrate. In an example, the second antenna package of the second antenna includes a metal pad(s) as part of an antenna feed fine that is exposed on an outer surface of the second antenna package and intersects the third plane (e.g., vertical plane) of the second metal patch(es). The metal pad(s) is coupled to the second metal patch(es), In this manner, when a second metal pad(s) is oriented to be coupled to the package substrate, the second metal patch(es) of the second antenna is automatically oriented in the third plane(s) (e.g., vertical plane(s)) orthogonal the second plane(s) (e.g., horizontal plane(s)) of the first metal patch(es) of the first antenna. This provides multi-directionality in the first and second antenna radiation patterns of the first and second antennas in the antenna module. As another example, metal pad(s) of the second antenna package of the second antenna can be surface mounted to the package substrate as a surface mount technology (SMT) to electrically couple the second antenna to the package substrate.

In another exemplary aspect, the package substrate of the antenna module can be attached to an application circuit board of an electronic device such that a first outer side of the package substrate is coupled to the application circuit board and a portion of the package substrate extends beyond an end of the circuit board. The first antenna package of the first antenna can be coupled to a second outer side of the package substrate on the opposite side of the first outer side. The second antenna package of the second antenna can be coupled to a portion of the first second outer side of the package substrate that extends beyond the end of the circuit board such that the second antenna package can be disposed in an open space adjacent to the application circuit board so as to not interfere with space consumed by the application circuit board. In this manner, the second antenna package is disposed the open space adjacent to the application circuit board to minimize the area impact of the antenna module when disposed in the electronic device.

In this regard, in one exemplary aspect, an antenna module is provided. The antenna module comprises a package substrate disposed in a first plane, the package substrate comprising a plurality of metallization layers parallel to each other. The antenna module also comprises a first antenna comprising a first antenna package. The first antenna package comprises a first antenna element disposed in a second plane parallel to the first plane, and a first external metal interconnect coupled to the first antenna element and at least one first metallization layer of the plurality of metallization layers. The antenna module also comprises a second antenna comprising a second antenna package. The second antenna package comprises a second antenna element disposed in a third plane orthogonal to the second plane, and a second external metal interconnect coupled to the second antenna element and at least one second metallization layer of the plurality of metallization layers. The antenna module also comprises a RFIC package coupled to the at least one first metallization layer and the at least one second metallization layer to electrically couple the RFIC to the first antenna element and the second antenna element.

In another exemplary aspect, a method of fabricating an antenna module with multiple antennas to provide multi-directional antenna radiation patterns is provided. The method comprises providing a package substrate disposed in a first plane comprising forming a plurality of metallization layers parallel to each other. The method also comprises providing a first antenna comprising providing a first antenna package comprising a first antenna element disposed in a second plane parallel to the first plane, and a first external metal interconnect coupled to the first antenna element. The method also comprises coupling the first external metal interconnect to at least one first metallization layer of the plurality of metallization layers of the package substrate. The method also comprises providing a second antenna comprising providing a second antenna package comprising a second antenna element disposed in a third plane orthogonal to the second plane, and a second external metal interconnect coupled to the second antenna element. The method also comprises coupling the second external metal interconnect to at least one second metallization layer of the plurality of metallization layers of the package substrate. The method also comprises coupling a RFIC package to the at least one first metallization layer and the at least one second metallization layer of the package substrate to electrically couple the RFIC to the first antenna element and the second antenna element.

In another exemplary aspect, an electronic device is provided. The electronic device comprises a circuit board comprising a first side, a second side opposite the first side, a third side adjacent to the first side and the second side, and a fourth side adjacent to the first side and the second side and opposite the third side. The electronic device also comprises an antenna module comprising a package substrate disposed in a first plane in a horizontal direction, a first antenna disposed in a second plane parallel to the first plane, and a second antenna disposed in a third plane orthogonal to the second plane. The antenna module also comprises a radio-frequency integrated circuit (RFIC) package coupled to the package substrate to electrically couple the RFIC to the first antenna and the second antenna. The package substrate of the antenna module further comprises a first section coupled to the first side of the circuit board, and a second section extending in the horizontal direction beyond a vertical plane of the third side of the circuit board extending in a vertical direction orthogonal to the horizontal direction. The first antenna is coupled to the first section of the package substrate, and the second antenna is coupled to the second section of the package substrate.

BRIEF DESCRIPTION OF THE FIGURES

FIG. 7 is a flowchart illustrating another exemplary fabrication process for fabricating a multi-directional antenna module that includes a first antenna coupled in a first orientation to the package substrate to have a first antenna radiation pattern in a first direction with respect to the package substrate, and a second antenna whose antenna package, as coupled to the package substrate, enforces a second orientation of the second antenna to provide second antenna radiation pattern in a second direction orthogonal to the first direction to support multi-directional antenna radiation patterns, including the antenna module in FIGS. 2A-3B and 5;

FIGS. 8A-8D illustrate exemplary fabrication stages during fabrication of the multi-directional antenna module fabricated according to the fabrication process in FIG. 7;

DETAILED DESCRIPTION

Figure 1:
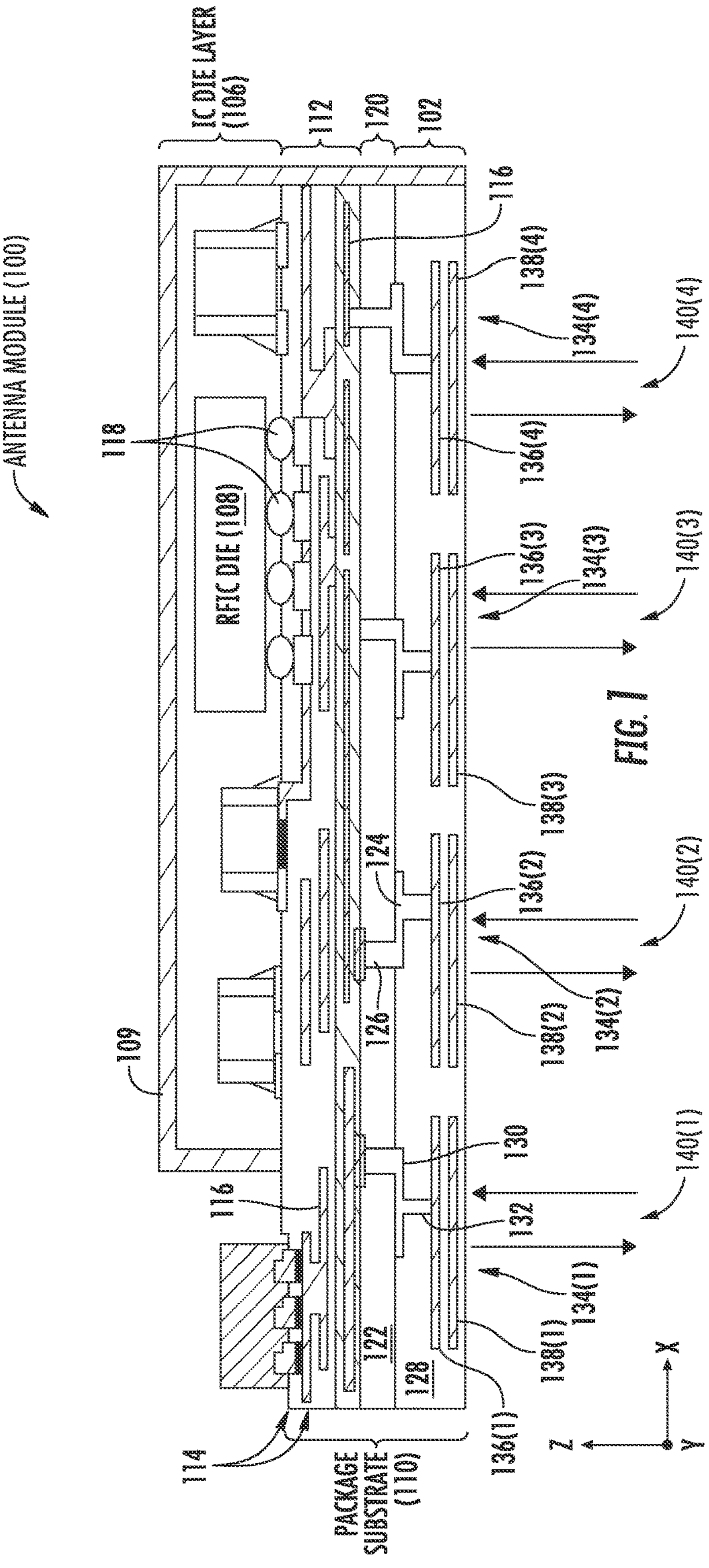
FIG. 1 is a side view of an antenna module in the form of a radio-frequency (RF) integrated circuit (IC) (RFIC) package that includes a package substrate supporting patch antennas horizontally formed in metallization layers of the package substrate.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include multi-directional antenna modules employing a surface-mount antenna(s) to support antenna pattern multi-directionality Related fabrication methods are also disclosed. The antenna module is designed be mounted and coupled to an application circuit board of an electronic device (e.g., a millimeter (mm) Wave communications device) to provide an RF communication capability for the electronic device. The antenna module includes a radio-frequency (RF) IC (RFIC) package that includes one or more RFICs for supporting RF signal transmission and reception. The antenna module also includes a package substrate that includes one or more metallization layers each disposed in a respective first plane (e.g. horizontal plane) and each having metal interconnects for routing of signals between the RFIC(s) and an antennas) coupled to the package substrate. In an exemplary aspect, a first antenna (e.g., a first patch antenna) is coupled to the package substrate and electrically coupled to an RFIC(s) through the package substrate to provide a first antenna. The antenna element(s) of the first antenna are disposed in a second plane (e.g. horizontal plane) parallel to package substrate such that the first antenna has a first antenna radiation pattern in a first direction (e.g., vertical direction) generally orthogonal to the package substrate. To provide additional antenna radiation pattern directionality, the antenna module also includes a second antenna (e.g., a second patch antenna) that is coupled to the package substrate such that its antenna element(s) is disposed in a third plane (e.g. vertical plane) oriented orthogonal to the package substrate. In this manner, the second antenna has a second antenna radiation pattern in a second direction (e.g. horizontal direction) orthogonal to the first direction (e.g., vertical direction) of the first antenna radiation pattern of the first antenna. Thus, the second antenna being coupled to the package substrate such that the orientation of its antenna element(s) is orthogonal to the orientation of the first antenna provides multi-directionality of antenna radiation patterns for the antenna module.

In exemplary aspects, as discussed in more detail below, the package substrate of the antenna module does not have to be flexible and bent as the method of orienting the first and second antennas in orthogonal planes to each other to achieve multi-directional antenna radiation patterns. In exemplary aspects, the package substrate of the antenna module is unbent such that its metallization layers extend in parallel planes in the same directions. The first antenna is packaged such that its first antenna element(s) is oriented in the second plane(s) (e.g. horizontal plane(s)) when the first antenna is coupled a metallization layer in the package substrate. The second antenna is packaged such that its second antenna element(s) is oriented in the third (e.g., vertical) plane(s) when the second antenna is coupled a metallization layer in the package substrate. In this manner, the first and second antennas are packaged such they are automatically oriented to be orthogonal to each other when coupled to the package substrate. Thus, the respective first and second antenna radiation patterns of the first and second antennas are in the respective first and second directions generally orthogonal to each other to provides multi-directionality of antenna radiation patterns in the antenna module. The antenna performance of the second antenna can be tuned in design by controlling the size of the second antenna element(s). In the case of the second antenna including multiple second antenna elements separated by a dielectric and configured to electro-magnetically (EM) coupled to each other, the distance between the multiple second antenna elements can be tuned in design to control antenna performance of the second antenna.

Before discussing examples of multi-directional antenna modules that include a first and second antennas coupled in a first and second orthogonal orientations to a package substrate to have respective first and second antenna radiation patterns that are orthogonal to each other for multi-directionality, an RFIC package in the form of an antenna module that does not have multi-directional antenna radiation patterns is first described with regard to FIG. 1. An example of a multi-directional antenna module that includes a first and second antennas coupled in a first and second orthogonal orientations to a package substrate to have respective first and second antenna radiation patterns that are orthogonal to each other for multi-directionality to support RF communications is discussed below starting at FIG. 2A.

In this regard, FIG. 1 is a view of an antenna module 100 that is a RFIC package. The antenna module 100 includes an antenna substrate 102 that supports antenna elements (e.g., patch and/or dipole antenna elements) for supporting RF communications. The antenna module 100 includes an IC die layer 106 disposed in a horizontal plane (X-axis and Y-axis direction plane) and that includes an RFIC die 108 that includes an encapsulated RF transceiver IC(s). The RFIC die 108 could also include a power management IC (PMIC). The IC die layer 106 is mounted to a package substrate 110 to provide a support structure for the IC die layer 106 and to also provide an interconnect structure for coupling the RFIC die 108 to other components and circuits in the antenna module 100. An electromagnetic interference (EMI) shield 109 is disposed around the RFIC die 108 and other components in the IC die layer 106. In this example, the package substrate 110 includes a metallization substrate 112 that is adjacent to the IC die layer 106. The metallization substrate 112 includes a plurality of substrate metallization layers 114 that each include metal interconnects 116 (e.g., pads, vertical interconnect accesses (vias), traces, lines) formed therein for providing interconnection structures to facilitate interconnections to provide an electrical interface between the RFIC die 108 and other components and circuits in the antenna module 100. Die interconnects 118 couple the RFIC die 108 to the metal interconnects 116 in the metallization substrate 112. The metallization substrate 112 may be a coreless substrate. The substrate metallization layers 114 could be formed as separate substrate layers that laminated together to form the metallization substrate 112. In this example, the metallization substrate 112 is coupled to a core substrate 120 as part of the package substrate 110. The core substrate 120 also includes one or more metallization layers 122 that include metal interconnects 124 coupled to vertical interconnect accesses (vias) 126 (e.g., metal pillars) coupled to metal interconnects 116 in the adjacent metallization substrate 112 to provide electrical connectivity between the metallization substrate 112 and the core substrate 120.

With continuing reference to FIG. 1, the package substrate 110 in the antenna module 100 also includes the antenna substrate 102. The antenna substrate 102 is coupled to the core substrate 120 such that the core substrate 120 is disposed between the antenna substrate 102 and the metallization substrate 112 in the vertical direction (Z-axis direction) in this example. The antenna substrate 102 also includes one or more metallization layers 128 that include metal interconnects 130 coupled to vias 132 coupled to metal interconnects 124 in the core substrate 120. The antenna substrate 102 includes four (4) antennas 134(1)-134(4) in this example, which include metal patches, that are electrically coupled to the RFIC die 108 through interconnections between the antenna 134(1)-134(4) and the metal interconnects 116, 124, 130 in the respective metallization substrate 112, core substrate 120, and antenna substrate 102. In this example, each antenna 134(1)-134(4) is a patch antenna that includes antennal elements in the form of first metal patches 136(1)-136(4) adjacent to the core substrate 120 and second metal patches 138(1)-138(4) disposed below the respective first metal patches 136(1)-136(4). The first metal patches 136(1)-136(4) are coupled to the RFIC die 108 through the via 132 and the metal interconnects 130, 124, 116 acting as an antenna feed line. The second metal patches 138(1)-138(4) are not in contact with the first metal patches 136(1)-136(4), but are configured to be electromagnetically (EM) coupled to the first metal patches 136(1)-136(4) when the first metal patches 136(1)-136(4) receive a RF signal to be radiated. Similarly, when the second metal patches 138(1)-138(4) are energized by a received RF signal, the second metal patches 138(1)-138(4) are EM coupled to the first metal patches 136(1)-136(4) with the received RF signal.

The first and second metal patches 136(1)-136(4), 138(1)-138(4) of the respective antennas 134(1)-134(4) are low profile structures that have respective radiation pattern directions 140(1)-140(4) predominantly in the vertical direction. (Z-axis direction) in the antenna module 100. However, the antennas 134(1)-134(4) do not provide a radiation pattern oriented in the Y-axis or Z-axis directions of the antenna module 100 as shown in FIG. 1. It may be desired to provide for the antenna module 100 to have the capability of having additional antenna radiation patterns for enhanced antenna coverage. Also, if the antenna module 100 is used for multiple input, multiple output (MIMO) communication applications, further additional antennas must be provided in the antenna module 100 to support the multiple MIMO signal streams, thus further increasing package size of the antenna module 100 in an undesired manner.

Figure 2A:
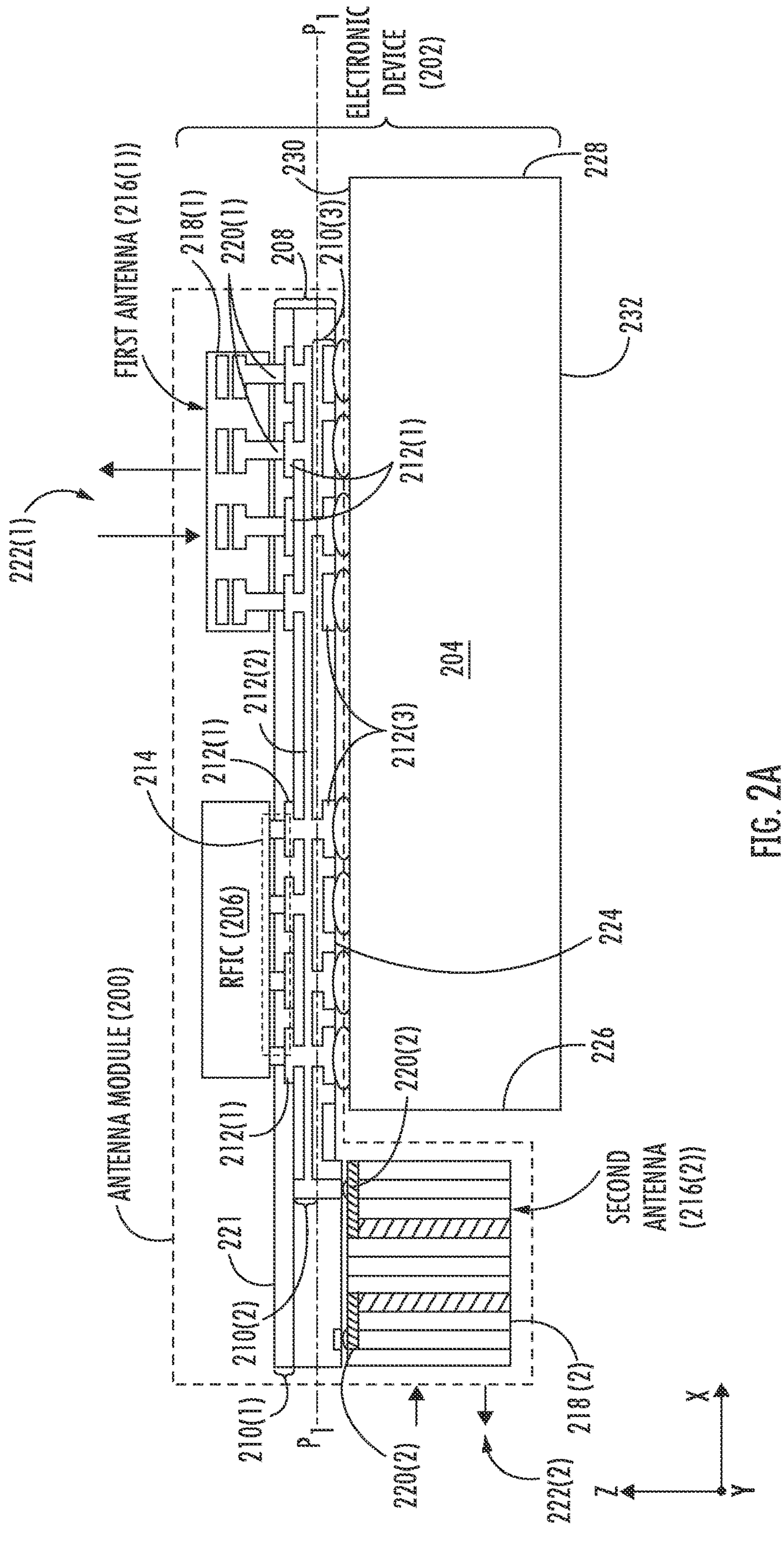
FIGS. 2A and 2B are respective cross-sectional side and perspective views of an exemplary electronic device that includes a multi-directional antenna module that includes a first antenna coupled in a first orientation to the package substrate to have a first antenna radiation pattern in a first direction with respect to the package substrate, and a second antenna whose antenna package, as coupled to the package substrate, enforces a second orientation of the second antenna to provide a second antenna radiation pattern in a second direction orthogonal to the first direction to support multi-directional antenna radiation patterns.
Figure 2B:
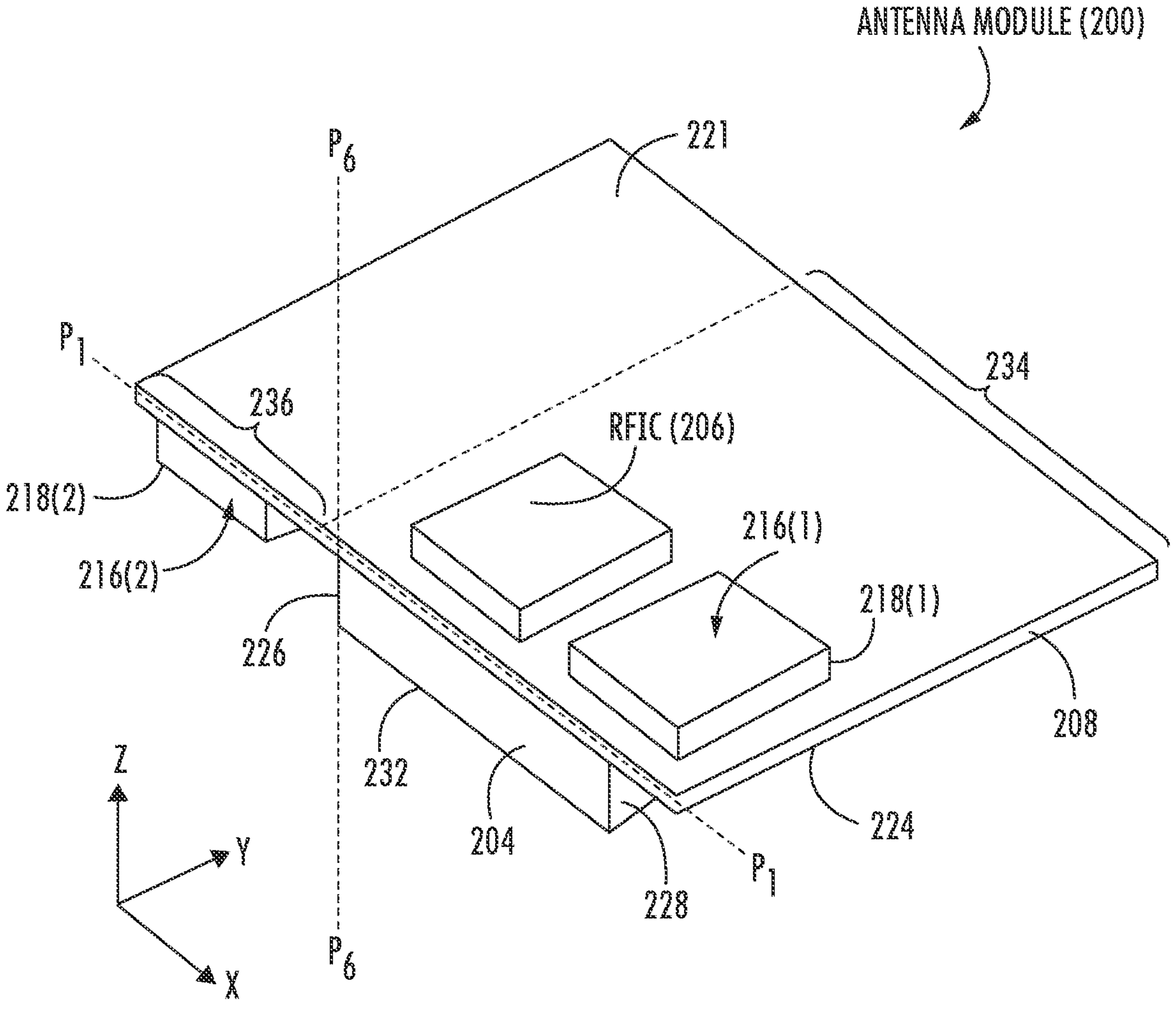

To provide an antenna module that includes multi-directional antenna radiation patterns, a multi-directional antenna module 200 in FIGS. 2A and 2B are provided. FIG. 2A illustrates a cross-sectional side view of the multi-directional antenna module 200. FIG. 2B illustrates a perspective view of the multi-directional antenna module 200. The multi-directional antenna module 200 is also referred to herein as "antenna module 200." As shown in FIG. 2A, the antenna module 200 is incorporated into an electronic device 202 in this example. The electronic device 202 includes a circuit board 204, which may be an application circuit board that includes a processor and/or other electronic circuitry to perform a specific application. It is desired to provide wireless RF communication capability to the electronic device 202 in this example. Thus, in this regard, the antenna module 200 is provided and communicatively coupled to the circuit board 204 and to electronic circuits therein to provide RF communication capability. The antenna module 200 includes a RFIC 206, which may be a RF system-in-a-package (SiP) for example, that includes RF circuitry configured to transmit and/or receive RF signals. For example, the RFIC 206 may include circuitry that supports communications protocols (e.g., fifth generation (5G)) that specify the need for wireless communications in millimeter (mm) Wave.

With continuing reference to FIGS. 2A and 2B, the RF IC 206 is coupled to a package substrate 208 that is disposed in a first, horizontal plane $P_1$ in the X- and Y-axes directions. As shown in FIG. 2A, the package substrate 208 includes a plurality of metallization layers 210(1)-210(3) that are each disposed in a horizontal plane in the X- and Y-axes parallel to each other. Each of the metallization layers 210(1)-210(3) include respective metal interconnects 212(1)-212(3) (e.g., metal pads, metal lines, metal traces, vertical interconnect accesses (vias)) formed therein. The metal interconnect 212(1)-212(3) provide interconnection structures to facilitate interconnections to provide an electrical interface between the RFIC 206 and other components in the antenna module 200. The RFIC 206 is electrically coupled to metal interconnects 212(1) in the metallization layer 210(1) of the package substrate 208, which is an outer metallization layer 210(1) of the package substrate 208, through external interconnects 214. In this manner, signals can be carried to and from the 206 through external metal interconnects 214 (e.g., solder balls, ball grid array (BGA) interconnects) and to the metallization layers 210(1)-201(3) in the package substrate 208 to be routed to antennas coupled to the package substrate 208.

In this regard, and as discussed in more detail below and shown in FIGS. 2A and 2B, the antenna module 200 in this example includes two (2) antennas as a first antenna 216(1) and a second antenna 216(2). Providing the first antenna 216(1) and the second antenna 216(2) in the antenna module 200 provide multi-directionality of antenna radiation patterns for the antenna module 200. As shown in FIG. 2A, the first antenna 216(1) is provided in a first antenna package 218(1) that includes exposed external metal interconnects 220(1) electrically coupled to the package substrate 208. The external metal interconnects 220(1) of the first antenna package 218(1) are coupled to the metallization layer 210(1) as an outer metallization layer on a first side 221 of the package substrate 208 to couple the first antenna 216(1) to the package substrate 208. The external metal interconnects 220(2) of the second antenna package 218(2) are coupled to the metallization layer 210(3) as an outer metallization layer on a second side 224 of the package substrate 208 to couple the second antenna 216(2) to the package substrate 208. In this example, the second antenna 216(2) is coupled to the second side 224 of the package substrate 208, opposite of the first side 221 of the package substrate 208 where the RFIC 206 and first antenna 216(1) are coupled. The RFIC 206 is electrically coupled to the first antenna 216(1) and the second antenna 216(2) through signal routing paths formed by the metal interconnects 212(1)-212(3) in the metallization layers 210(1)-210(3) of the package substrate 208.

With continuing reference to FIG. 2A, and as discussed in more detail below, the first antenna package 218(1) of the first antenna 216(1) is oriented to be coupled to the package substrate 208 of the antenna module 200 such that the first antenna 216(1) is oriented to the package substrate 208 to have a first antenna radiation pattern 222(1) generally in the vertical direction (Z-axis direction) that is orthogonal to the horizontal plane $P_1$ of the package substrate 208. To provide multi-directionality of antenna radiation patterns in the antenna module 200, the second antenna package 218(2) of the second antenna 216(2) is oriented to be coupled to the package substrate 208 of the antenna module 200 such that the second antenna 216(2) is oriented to the package substrate 208 to have a second antenna radiation pattern 222(2) generally in the horizontal direction (X-axis direction) that is parallel to the horizontal plane $P_1$ of the package substrate 208. In this manner, the first and second antennas 216(1), 216(2) have antenna radiation patterns 222(1), 222(2) that are generally directed in different directions to provide multi-functionality of antenna radiation patterns in the antenna module 200.

Figure 3A:
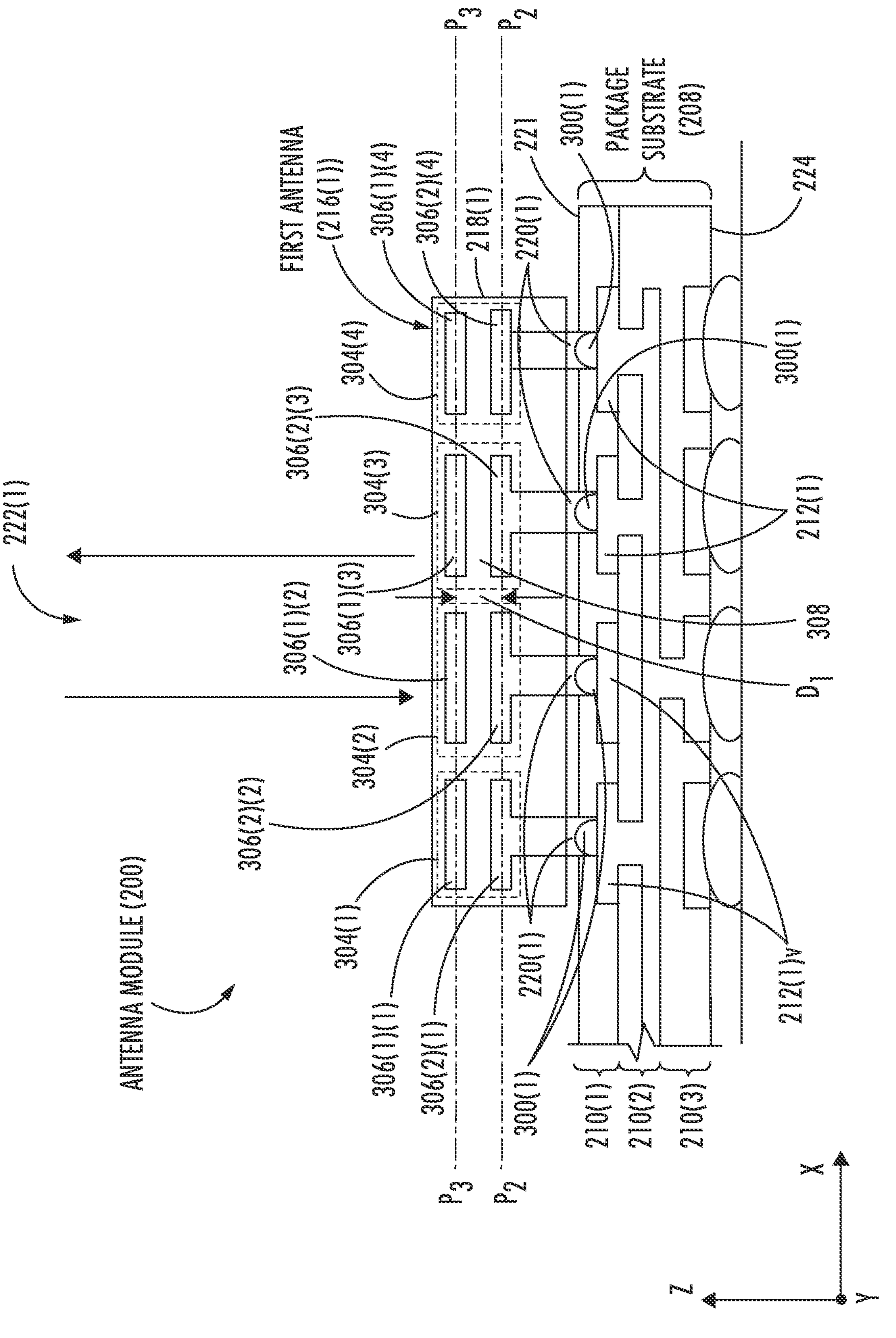
FIGS. 3A and 3B are respective cross-sectional side views of the first antenna package of the first antenna and the second antenna package of the second antenna coupled to the package substrate of the multi-directional antenna module in FIGS. 2A and 2B.
Figure 3B:
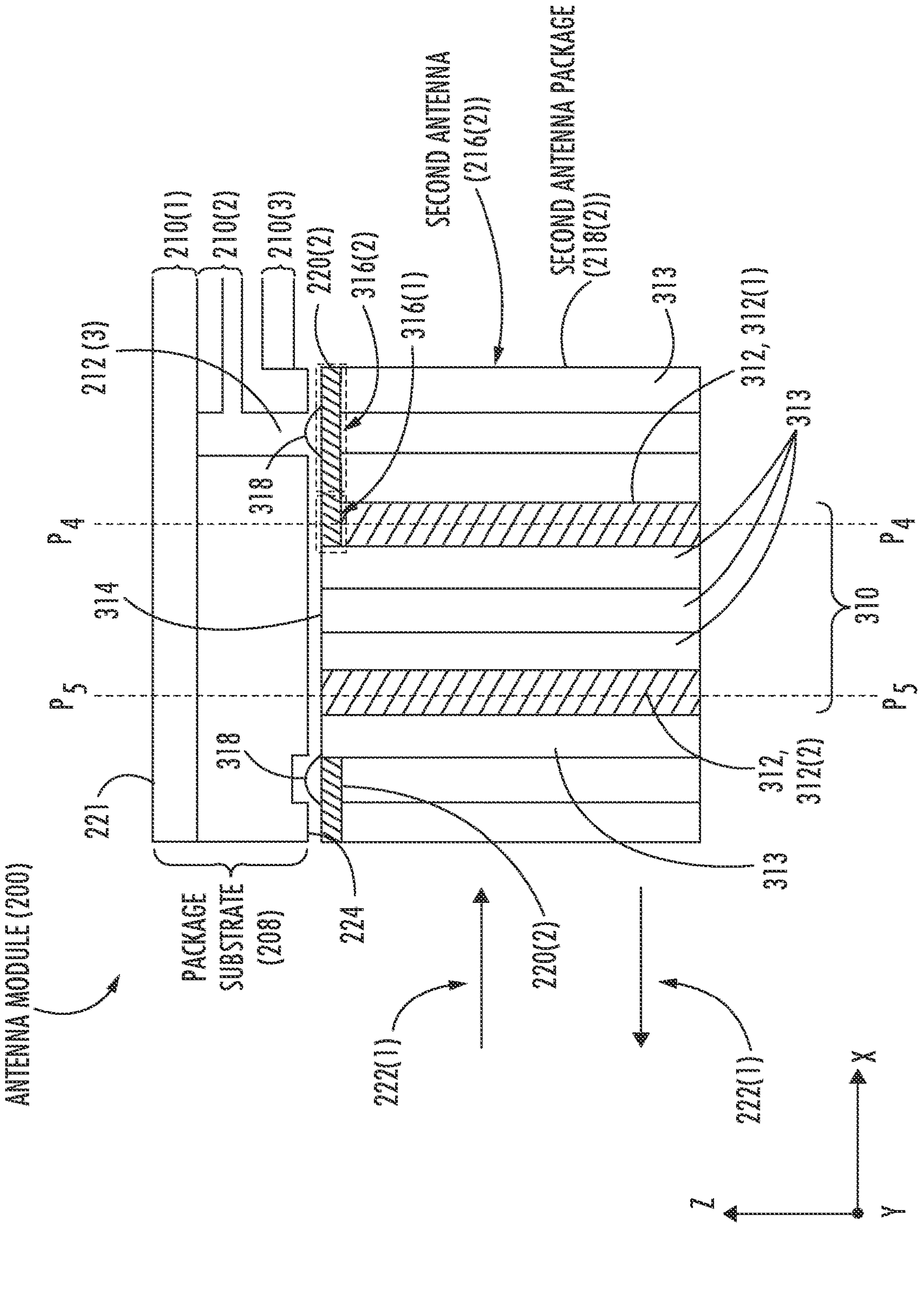

To illustrate and discuss more exemplary detail of the first and second antennas 216(1), 216(2) and their orientation and connectivity to the package substrate 208 in FIGS. 2A and 2B, FIGS. 3A and 3B are provided. FIG. 3A is a cross-sectional side view of the first antenna package 218(1) of the first antenna 216(1) coupled to the package substrate 208 of the antenna module 200 in FIGS. 2A and 2B. FIG. 3B is a cross-sectional side view of the second antenna package 218(1) of the second antenna 216(1) coupled to the package substrate 208 of the antenna module 200 in FIGS. 2A and 2B.

As shown in FIG. 3A, the first antenna package 218(1) of the first antenna 216(1) is coupled through external metal interconnects 220(1) to the metallization layer 210(1) on the first side 221 of the package substrate 208. The external metal interconnects 220(1) are shown in this example as being coupled to external metal interconnects 300(1) (e.g., solder humps) formed in contact with metal interconnects 212(1) in the metallization layer 210(1) with the metal interconnects 212(1) in the metallization layer 210(1). In this example, the first antenna 216(1) includes four (4) patch antennas 304(1)-304(4). Each patch antenna 304(1)-304(4) includes two (2) antenna elements 306(1)(1)-306(2)(4) (also generally referred to as "antenna element 306"). An antenna element is a metal component that has the capability of radiating RF energy and received radiated RF energy. In this example, the antenna elements 306(1)(1)-306(2)(4) are metal patches which are metal structures that are planar or substantially planar in shape. The antenna elements 306(1)(1)-306(1)(4) are each disposed in a second, horizontal plane $P_2$ (in the X- and Y-axes directions) and are directly coupled to the external metal interconnects 300(1) of the first antenna package 218(1) that form part of antenna feed lines for the respective antenna elements 306(1)(1)-306(1)(4). The antenna elements 306(2)(1)-306(2)(4) are each disposed in a third, horizontal plane $P_3$ (in the X- and Y-axes directions) separated by a dielectric layer 308 a distance $D_1$ from the respective antenna elements 306(1)(1)-306(2)(4). The antenna elements 306(2)(1)-306(2)(4) are configured to be EM coupled to the respective antenna elements 306(1)(1)-306(1)(4') when the antenna elements 306(1)(1)-306(1)(4) receive transmission RF signals from the RFIC 206 to be transmitted wirelessly and radiated through the antenna elements 306(2)(1)-306(2)(4). The antenna elements 306(1)(1)-306(1)(4) are configured to be EM coupled to the respective antenna elements 306(2)(1)-306(2)(4) when the antenna elements 306(2)(1)-306(2)(4) receive RF signals as reception signals to be distributed to the RFIC 206 through the package substrate 208.

Thus, in the example of the first antenna 216(1) as shown in FIG. 3A, the first antenna package 218(1) is configured with the antenna elements 306(1)(1)-306(2)(4) oriented in second and third horizontal planes $P_2$, $P_3$ parallel to the first, horizontal plane $P_1$ of the package substrate 208 as the first antenna package 218(1) is coupled to the package substrate 208, This orientation enforces the first antenna radiation pattern 222(1) of the antenna elements 306(2)(1)-306(2)(4) of the first antenna 216(1) to be in a vertical direction (Z-axis direction) orthogonal to the horizontal plane $P_1$ of the package substrate 208.

The second antenna 216(2) and its second antenna package 218(2) are shown in more detail in FIG. 3B. As shown in FIG. 3B, the second antenna 216(2) includes a patch antenna 310, The patch antenna 310 includes two (2) antenna elements 312(1), 312(2) (also generally referred to as "312") in the form of metal patches. The antenna elements 312(1), 312(2) are each disposed in a respective vertical plane $P_4$, $P_5$ (in the X- and Z-axes directions). The antenna element 312(1) is directly coupled to an external metal interconnect 220(2) of the second antenna package 218(2) that form part of an antenna feed line for the patch antenna 310. As discussed above, orienting the antenna elements 312(1), 312(2) in a respective vertical plane $P_1$, $P_5$ provides for the second antenna radiation pattern 222(2) of the second antenna 216(2) to be orthogonal to the first antenna radiation pattern 222(1) of the first antenna 216(1) to provide multi-directionality of the antenna radiation patterns in the antenna module 200. Dielectric layers 313 are inter-disposed between the antenna elements 312(1), 312(2). The antenna element 312(2) is configured to be EM coupled to the antenna element 312(1) when the antenna element 312(1) receives transmission RF signals from the RFIC 206 to be transmitted wirelessly and radiated through the antenna element 312(2) in the second antenna radiation pattern 222(1). The antenna element 312(2) is also configured to be EM coupled to the antenna element 312(1) when the antenna element 312(2) receives RF signals as reception signals to be distributed to the RFIC 206 through the package substrate 208.

Note that additional antenna elements that form other patch antennas may be provided in the second antenna package 218(2) that are not shown. For example, one of the metal interconnects 220(2) of the second antenna package 218(2) in FIG. 3B is shown as not being coupled, but the metal interconnect 220(2) in the form of a metal pad is coupled to another antenna element that is not shown is behind the cross-sectional view in FIG. 3B.

With continuing reference to FIG. 3B, it is desired to provide for the second antenna package 218(2) to arrange its metal interconnects 220(2) to be coupled to the package substrate 208 in a manner that enforces the orientation of the antenna elements 312(1), 312(2) in their vertical planes $P_4$, $P_5$ to provide multi-directionality of the antenna module 200. However, unlike the antenna elements 306(1)(1)-306(2)(4) in the first antenna package 218(1) shown in FIG. 3A oriented in horizontal planes $P_2$, $P_3$ parallel to the package substrate 208, the antenna elements 312(1), 312(2) of the second antenna 216(2) are oriented in vertical plane $P_4$, $P_5$ orthogonal to the package substrate 208. Thus, in this example, the external metal interconnects 220(2) used to couple the second antenna package 218(1) of the second antenna 216(2) to the metallization layer 210(3) on the second side 224 of the package substrate 208 are provided in the form of metal pads. The external metal interconnects 220(2) in the form of metal pads are exposed from an outer surface 314 of the second antenna package 218(2). The external metal interconnects 220(2) being metal pads allows the flexibility of coupling the antenna elements 312(1), 312(2) of the second antenna 216(2) oriented in their vertical planes $P_4$, $P_5$ orthogonal to the package substrate 208 while providing a sufficient metal surface area for coupling to the package substrate 208. The external metal interconnect 220(2) coupled to the antenna element 312(1) can extend such that it has a first metal portion 316(1) that intersects the respective vertical plane $P_4$ of the antenna element 312(1) and a second metal portion. 316(2) that extends in a direction orthogonal to the vertical plane $P_4$ of the antenna element 312(1) and does not intersect the vertical plane $P_4$ of the antenna element 312(1). In this example, the external metal interconnects 220(2) are coupled to the metal interconnect 212(3) of the metallization layer 210(3) of the package substrate 208 through metal contacts 318 that are coupled to the external metal interconnects 220(2). For example, the external metal interconnects 220(2) being in the form of metal pads allows the second antenna package 218(2) to be surface-mounted to the package substrate 208, such as using surface mount technology (SMT).

With reference back to FIGS. 2A and 2B, in the example of the antenna module 200, the second antenna package 218(2) is coupled to the second side 224 of the package substrate 208, on the opposite side of the first side 221 that the first antenna package 218(1) is coupled. This may be advantageous to conserve space and height, because it allows the second antenna package 218(2) to be disposed adjacent to a side 226 of the circuit board 204 that has additional area due to the package substrate 208 extending beyond the circuit board 204 in the horizontal direction (X-axis direction). If the second antenna package 218(2) were coupled to the first side 226 of the package substrate 208, the overall height of the electronic device 202 in the vertical direction (Z-axis direction) may be increased. In this regard, the circuit board 204 has a first side 226, a second side 228 opposite the first side, a third side 230 adjacent to the package substrate 208 and adjacent to the first side 226 and the second side 228, and a fourth side 232 on the opposite side of the third side 230 and adjacent to the first side 226 and the second side 228. This arrangement is caused by the package substrate 208 having a first section 234 that is coupled to the third side 230 of the circuit board 204 and a second section 236 extending in the horizontal direction (X-axis direction) beyond a vertical plane $P_6$ of the third side 226 of the circuit board 204 extending in a vertical direction (Z-axis direction). The first section 234 of the package substrate is coupled to the third side 230 of the circuit board 204. The external metal interconnects 220(1) of the first antenna package 218(1) are coupled to the metallization layer 210(1) in the first section 234 of the package substrate 208. The external metal interconnects 220(2) of the second antenna package 218(2) are coupled to the metallization layer 210(3) in the first section 236 of the package substrate 208.

Figure 4:
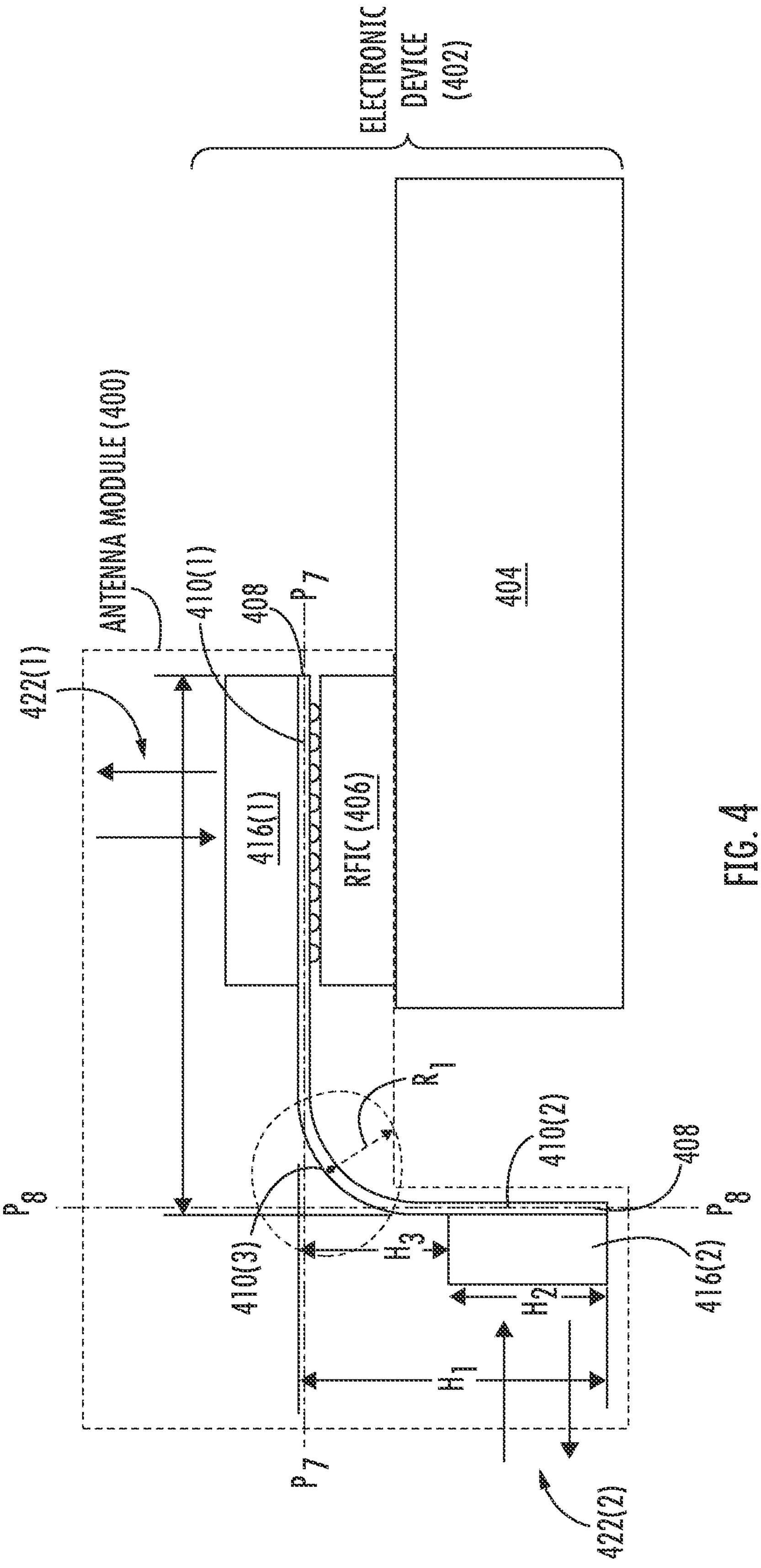
FIG. 4 is a cross-sectional side view of another electronic device that includes a multi-directional antenna module that includes a first antenna coupled in a first orientation to an unbent portion of a package substrate to have a first antenna radiation pattern in a first direction with respect to the package substrate, and a second antenna coupled to a bent portion of the package substrate to provide second antenna radiation pattern in a second direction orthogonal to the first direction.

Another way to provide for first and second antennas to be coupled to a package substrate in orthogonal orientations to each other for multi-directionality is to provide for the package substrate to be flexible. This is shown in the example antenna module 400 in FIG. 4. FIG. 4 illustrates a cross-sectional side view of another multi-directional antenna module 400, which is also referred to herein as "antenna module 400." As shown in FIG. 4, the antenna module 400 is incorporated into an electronic device 402 in this example. The electronic device 402 includes a circuit board 404, which may be an application circuit board that includes a processor and/or other electronic circuitry to perform a specific application. The antenna module 400 includes a RFIC 406, which may be a RF system-in-a-package (SiP) for example, that includes RF circuitry configured to transmit and/or receive RF signals. The RFIC 406 is coupled to a package substrate 408 that is bent with a first section 410(1) disposed in a first, horizontal plane $P_7$ in the X- and V-axes directions, and a second section 410(2) disposed in a second, vertical plane $P_8$ in the X- and Z-axes directions by being bent about ninety (90) degrees from the first section 410(1). This causes the package substrate 408 to a curved section 410(3) between the first and second sections 410(1), 410(2), because the package substrate 408 has a minimum bend radium RI to avoid damaging the package substrate 408. This allows both a first antenna 416(1) coupled to the first section 410(1) of the package substrate 408 and a second antenna 416(2) coupled to the second section 410(2), to be coupled to the package substrate 408 in the same orientation. For example, the first and second antennas 416(1), 416(2) may both be like the first antenna 216(1) in the antenna module 200 in FIGS. 2A and 2B. But because the second antenna 416(2) is attached to a bent section 410(3) of the package substrate 408, this causes the orientation of the second antenna 416(2) to be orthogonal to the first antenna 416(1) and to have respective orthogonal antenna radiation patterns 422(1), 422(2).

With continuing reference to FIG. 4, while the antenna module 400 in FIG. 4 has multi-directionality of the antenna radiation patterns 422(1), 422(2) of the first and second antennas 416(1), 416(2), it is difficult to precisely control the bending of the package substrate 408 during manufacturing. The combined height $H_1$ of the package substrate 408 and second antenna 416(2) in the vertical direction (Z-axis direction) also increased, because this height $H_1$ has to account for and include the height $H_2$ of the curved section 410(3) that cannot support mounting of a portion of the second antenna 416(1). The second antenna 416(2) is coupled to the flat portion of the second, bent section 410(3) of the package substrate 408. The height $H_1$ can be reduced by reducing the height $H_3$ of the second antenna 416(2), but this may reduce the antenna performance of the second antenna 416(2) in an undesirable manner. Further, because the package substrate 408 is flexible, a ground plane for the second antenna 416(2) formed in the curved section 410(3) of the package substrate 408 may have to includes voids (e.g., a mesh structure) so that the package substrate 408 can be bent without damaging such ground plane. This can also result in a comprised ground plane for the second antenna 416(2) resulting in a reduction in antenna performance of the second antenna 416(2).

Figure 5:
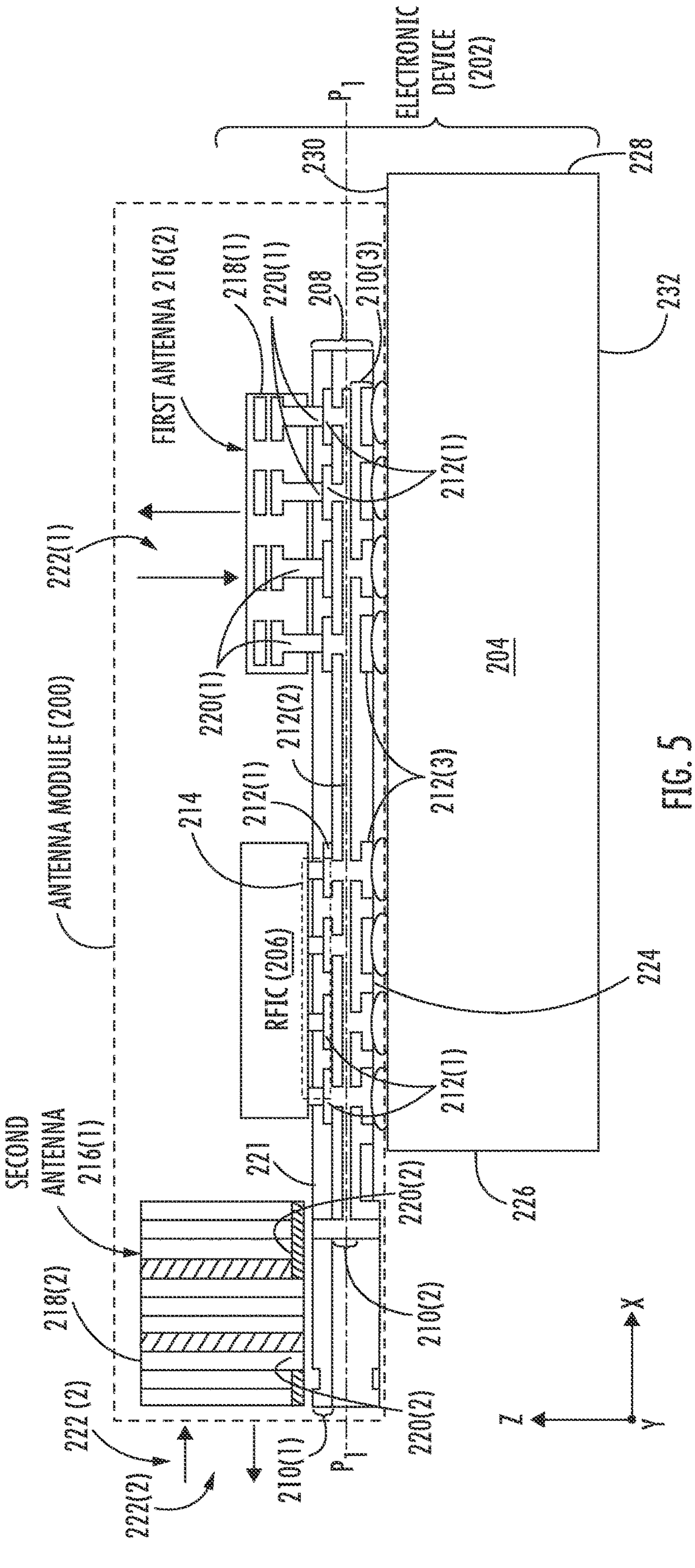
FIG. 5 is a cross-sectional side view of another exemplary electronic device that includes a multi-directional antenna module similar to the multi-directional antenna module in FIGS. 2A and 2B, but wherein the first and second antennas are coupled to the same outer metallization layer of the package substrate.

Other orientations of the antenna module 200 in FIGS. 2A and 2B that does not have a bent package substrate 208, but yet provides for the first and second antenna packages 218(1), 218(2) of the respective first and second antennas 216(1), 216(2) to be coupled to the package substrate 208 and arranged orthogonal to each other are possible. For example, FIG. 5 is a side view of the same circuit board 204 as provided in the electronic device 202 in FIGS. 2A and 2B. In the alternative electronic device 504 in FIG. 5, a multi-directional antenna module 500 is provided that is similar to the antenna module 200 in FIGS. 2A and 2B, but wherein the first and second antenna packages 218(1), 218(2) of the respective first and second antennas 216(1), 216(2) are coupled to same side 221 of the package substrate 208 and thus the same metallization layer 210(1) of the package substrate 208. Common elements between the antenna module 500 in FIG. 5 and the antenna module 200 in FIGS. 2A and 2B are shown with common element numbers between FIGS. 2A-2B and FIG. 5. The previous description of such common elements is also applicable for the antenna module 500 in FIG. 5 and thus are not re-described.

Figure 6:
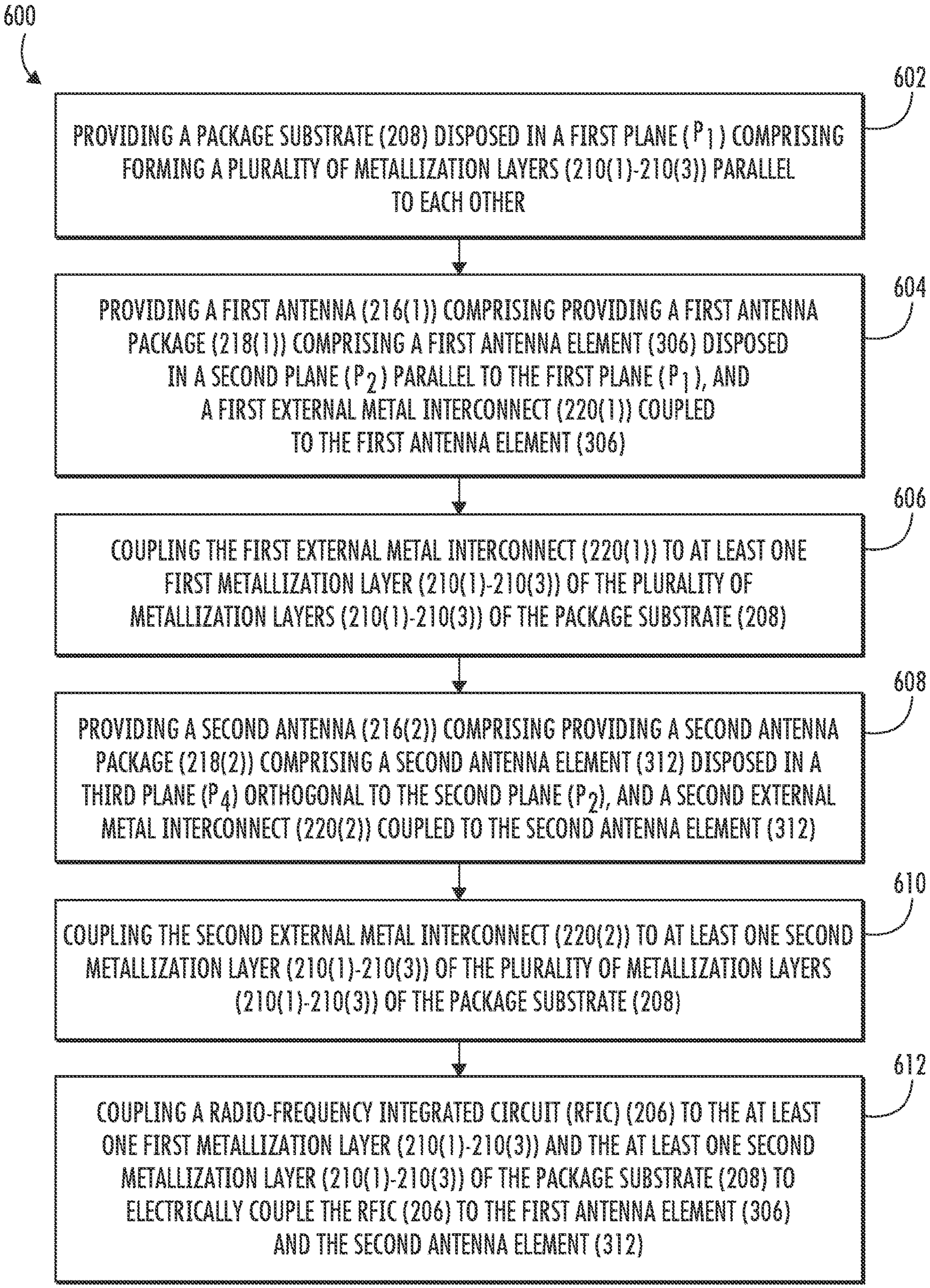
FIG. 6 is a flowchart illustrating an exemplary process for fabricating a multi-directional antenna module that includes a first antenna coupled in a first orientation to the package substrate to have a first antenna radiation pattern in a first direction with respect to the package substrate, and a second antenna whose antenna package, as coupled to the package substrate, enforces a second orientation of the second antenna to provide a second antenna radiation pattern in a second direction orthogonal to the first direction to support multi-directional antenna radiation patterns, including the antenna module in FIGS. 2A-3B and 5.

There are various manners in which a multi-directional antenna module that includes a first antenna coupled in a first orientation to the package substrate to have a first antenna radiation pattern in a first direction with respect to the package substrate, and a second antenna whose antenna package, as coupled to the package substrate, enforces a second orientation of the second antenna to provide second antenna radiation pattern in a second direction orthogonal to the first direction to support multi-directional antenna radiation patterns, including the antenna module in FIGS. 2A-3B and 5, including the antenna modules 200, 500 in FIGS. 2A-3B and 5, can be formed and fabricated. In this regard, FIG. 6 is a flowchart illustrating an exemplary fabrication process 600 for fabricating such a multi-directional antenna. The fabrication process 600 in FIG. 6 is discussed with regard to the antenna module 200 in FIGS. 2A and 2B as an example.

In this regard, as shown in FIG. 6, the fabrication process 600 includes providing a package substrate 208 disposed in a first plane $P_1$ comprising forming a plurality of metallization layers 210(1)-210(3) parallel to each other (block 602 in FIG. 6). The fabrication process 600 also includes providing a first antenna 216(1) comprising providing a first antenna package 218(1) comprising a first antenna element 306 disposed in a second plane $P_2$ parallel to the first plane $P_1$, and a first external metal interconnect 220(1) coupled to the first antenna element 306) (block 604 in FIG. 6). The fabrication process 600 also includes coupling the first external metal interconnect 220(1) to at least one first metallization layer 210(1)-210(3) of the plurality of metallization layers 210(1)-210(3) of the package substrate 208 (block 606 in FIG. 6). The fabrication process 600 also includes providing a second antenna 216(2) comprising providing a second antenna package 218(2) comprising a second antenna element 312(1) disposed in a third plane $P_4$ orthogonal to the second plane $P_2$, and a second external metal interconnect 220(2) coupled to the second antenna element 312 (block 608 in FIG. 6). The fabrication process 600 also includes coupling the second external metal interconnect 220(2) to at least one second metallization layer 210(1)-210(3) of the plurality of metallization layers 210(1)-210(3) of the package substrate 208 (block 610 in FIG. 6). The fabrication process 600 also includes coupling a RFIC 206 to the at least one first metallization layer 210(1)-210(3) and the at least one second metallization layer 210(1)-210(3) of the package substrate 208 to electrically couple the RFIC 206 to the first antenna element 306 and the second antenna element 312 (block 612 in FIG. 6).

Other fabrication methods are also possible. For example, FIG. 7 another exemplary fabrication process 700 for fabricating an antenna module like antenna modules 200 in FIGS. 2A and 2B, and antenna module 500 in FIG. 5, according to the fabrication stages 800A-800D in FIGS. 8A-8D. The 800A-800D in FIGS. 8A-8D according to the exemplary fabrication process 700 in FIG. 7 will now be discussed in regard to the antenna module 200 in FIGS. 2A and 2B as an example.

In this regard, as shown in exemplary fabrication stage 800A in FIG. 8A, a first step in the fabrication process 700 is to provide the package substrate 208 (block 702 in FIG. 7). The package substrate 208 can be formed as the plurality of metallization layers 210(1)-210(3) laminated on top of each other. The package substrate 208 can be formed as one or more redistribution layers (RDLs). The package substrate 208 can be a cored or coreless substrate. The package substrate 208 could include one or more embedded trace substrate (ETS) layers that have metal interconnects embedded in a respective insulating layer.

As shown in exemplary fabrication stage 800B in FIG. 8B, a next step in the fabrication process 700 is to couple the RFIC 206 to the metallization layer 210(1) of the package substrate 208 (block 704 in FIG. 7). As shown in exemplary fabrication stage 800C in FIG. 8C, a next step in the fabrication process 700 is to couple the first antenna 216(1), and more specifically its first antenna package 218(1) to the metallization layer 210(1) of the package substrate 208 (block 706 in FIG. 7). As previously discussed, this involves coupling the metal interconnects 220(1) of the first antenna package 218(1) to metal interconnects 212(1) of the metallization layer 210(1) of the package substrate 208. As shown in the exemplary fabrication stage 800D in FIG. 8D, a next step in the fabrication process 700 is to couple the second antenna 216(2), and more specifically its second antenna package 218(2) to the metallization layer 210(3) of the package substrate 208 such that the second antenna 216(2) is oriented orthogonal to the first antenna 216(1) (block 708 in FIG. 7). As previously discussed, this involves coupling the metal interconnects 220(2) of the second antenna package 218(2) to metal interconnects 212(3) of the metallization layer 210(3) of the package substrate 208. The metal interconnects 220(2) may be metal pads that are surface mounted to the package substrate 208.

Multi-directional antenna modules that include a first antenna coupled in a first orientation to the package substrate to have a first antenna radiation pattern in a first direction with respect to the package substrate, and a second antenna whose antenna package, as coupled to the package substrate, enforces a second orientation of the second antenna to provide second antenna radiation pattern in a second direction orthogonal to the first direction to support multi-directional antenna radiation patterns, including, but not limited to, the multi-directional antenna modules in FIGS. 2-3B and 8A-8D, and according to any of the fabrication processes in FIGS. 6-7, may be provided in or integrated into any wireless communication device and/or processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SiP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 9:
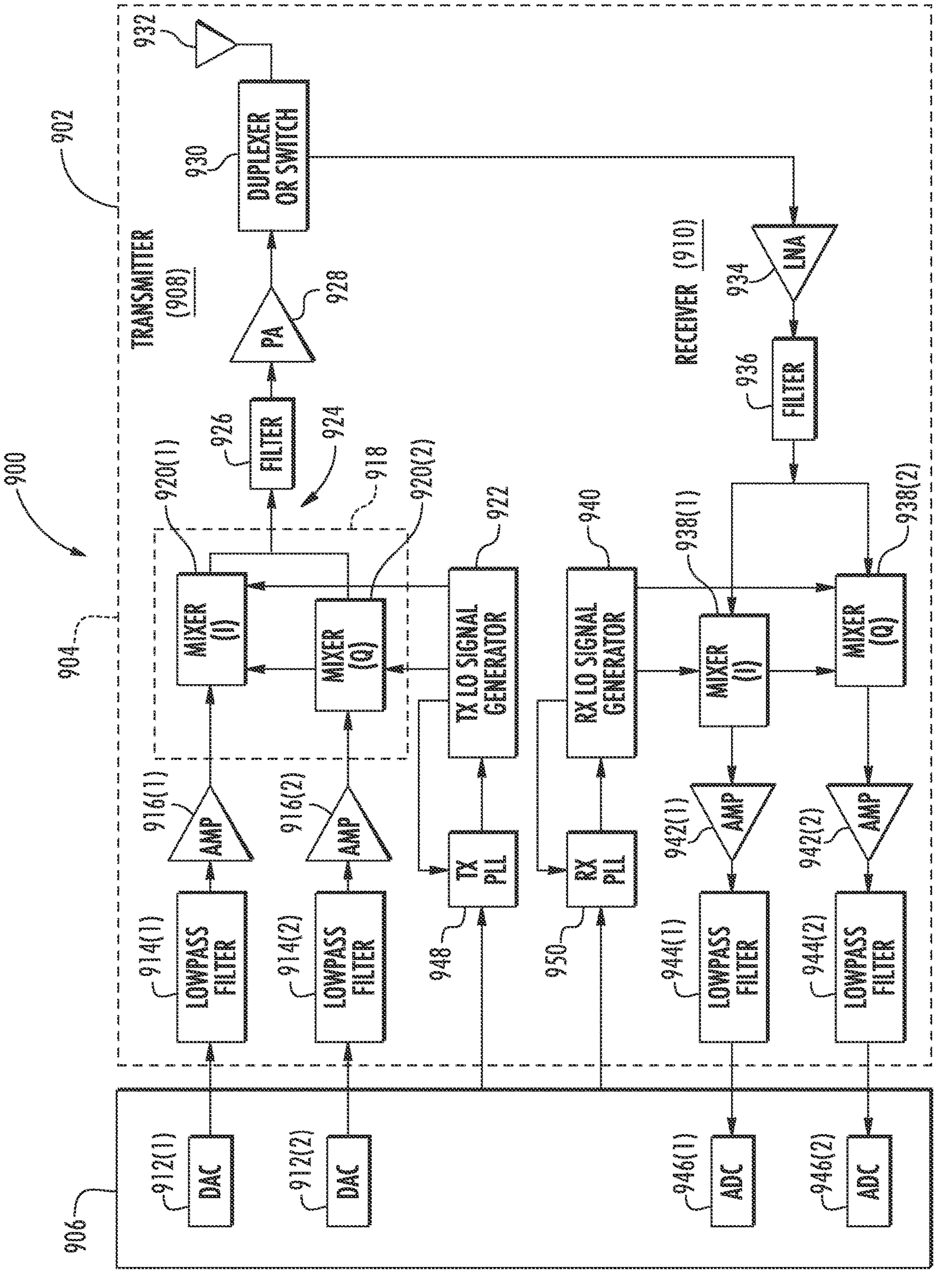
FIG. 9 is a block diagram of an exemplary wireless communications device that includes a multi-directional antenna module that includes a first antenna coupled in a first orientation to the package substrate to have a first antenna radiation pattern in a first direction with respect to the package substrate, and a second antenna whose antenna package, as coupled to the package substrate, enforces a second orientation of the second antenna to provide second antenna radiation pattern in a second direction orthogonal to the first direction to support multi-directional antenna radiation patterns, including, but not limited to, the multi-directional antenna modules in FIGS. 2A-3B, 5 and 8A-8D, and according to any of the fabrication processes in FIGS. 6 and 7.

FIG. 9 illustrates an exemplary wireless communications device 900 that includes a multi-directional antenna module 902 that includes a first antenna coupled in a first orientation to the package substrate to have a first antenna radiation pattern in a first direction with respect to the package substrate, and a second antenna whose antenna package, as coupled to the package substrate, enforces a second orientation of the second antenna to provide second antenna radiation pattern in a second direction orthogonal to the first direction to support multi-directional antenna radiation patterns, including, but not limited to, the multi-directional antenna modules in FIGS. 2-3B, 5, and 8A-8D, and according to any of the fabrication processes in FIGS. 6-7. The wireless communications device 900 may include or be provided in any of the above-referenced devices, as examples. As shown in FIG. 9, the wireless communications device 900 includes a transceiver 904 and a data processor 906. The data processor 906 may include a memory to store data and program codes. The transceiver 904 includes a transmitter 908 and a receiver 910 that support bi-directional communications. In general, the wireless communications device 900 may include any number of transmitters 908 and/or receivers 910 for any number of communication systems and frequency bands. All or a portion of the transceiver 904 may be implemented on one or more analog ICs, RFICs, mixed-signal ICs, etc.

The transmitter 908 or the receiver 910 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 910. In the direct-conversion architecture, a signal is frequency-converted between RF and baseband in one stage. The super-heterodyne and direct-conversion architectures may use different circuit blocks and/or have different requirements. In the wireless communications device 900 in FIG. 9, the transmitter 908 and the receiver 910 are implemented with the direct-conversion architecture.

In the transmit path, the data processor 906 processes data to be transmitted and provides I and Q analog output signals to the transmitter 908. In the exemplary wireless communications device 900, the data processor 906 includes digital-to-analog converters (DACs) 912(1), 912(2) for converting digital signals generated by the data processor 906 into the I and Q analog output signals, e.g., I and Q output currents, for further processing.

Within the transmitter 908, lowpass filters 914(1), 914(2) filter the I and Q analog output signals, respectively, to remove undesired signals caused by the prior digital-to-analog conversion. Amplifiers (AMPs) 916(1), 916(2) amplify the signals from the lowpass filters 914(1), 914(2), respectively, and provide I and Q baseband signals. An upconverter 98 upconverts the I and Q baseband signals with I and Q transmit (TX) local oscillator (LO) signals through mixers 920(1), 920(2) from a TX LO signal generator 922 to provide an upconverted signal 924. A filter 926 filters the upconverted signal 924 to remove undesired signals caused by the frequency upconversion as well as noise in a receive frequency band. A power amplifier (PA) 928 amplifies the upconverted signal 924 from the filter 926 to obtain the desired output power level and provides a transmit RF signal. The transmit RF signal is routed through a duplexer or switch 930 and transmitted via an antenna 932.

In the receive path, the antenna 932 receives signals transmitted by base stations and provides a received RF signal, which is routed through the duplexer or switch 930 and provided to a low noise amplifier (LNA) 934. The duplexer or switch 930 is designed to operate with a specific receive (RX)-to-TX duplexer frequency separation, such that RX signals are isolated from TX signals. The received RF signal is amplified by the LNA 934 and filtered by a filter 936 to obtain a desired RF input signal. Downconversion mixers 938(1), 938(2) mix the output of the filter 936 with I and Q RX LO signals (i.e., LO_I and LO_Q) from an RX LO signal generator 940 to generate I and Q baseband signals. The I and Q baseband signals are amplified by AMPs 942(1), 942(2) and further filtered by lowpass filters 944(1), 944(2) to obtain. I and Q analog input signals, which are provided to the data processor 906. In this example, the data processor 906 includes analog-to-digital converters (ADCs) 946(1), 946(2) for converting the analog input signals into digital signals to be further processed by the data processor 906.

In the wireless communications device 900 of FIG. 9, the TX LO signal generator 922 generates the I and Q TX LO signals used for frequency upconversion, while the RX LO signal generator 940 generates the I and Q RX LO signals used for frequency downconversion. Each LO signal is a periodic signal with a particular fundamental frequency. A TX phase-locked loop (PLL) circuit 948 receives timing information from the data processor 906 and generates a control signal used to adjust the frequency and/or phase of the TX LO signals from the TX LO signal generator 922. Similarly, an RX PLL circuit 950 receives timing information from the data processor 906 and generates a control signal used to adjust the frequency and/or phase of the RX LO signals from the RX LO signal generator 940.

Figure 10:
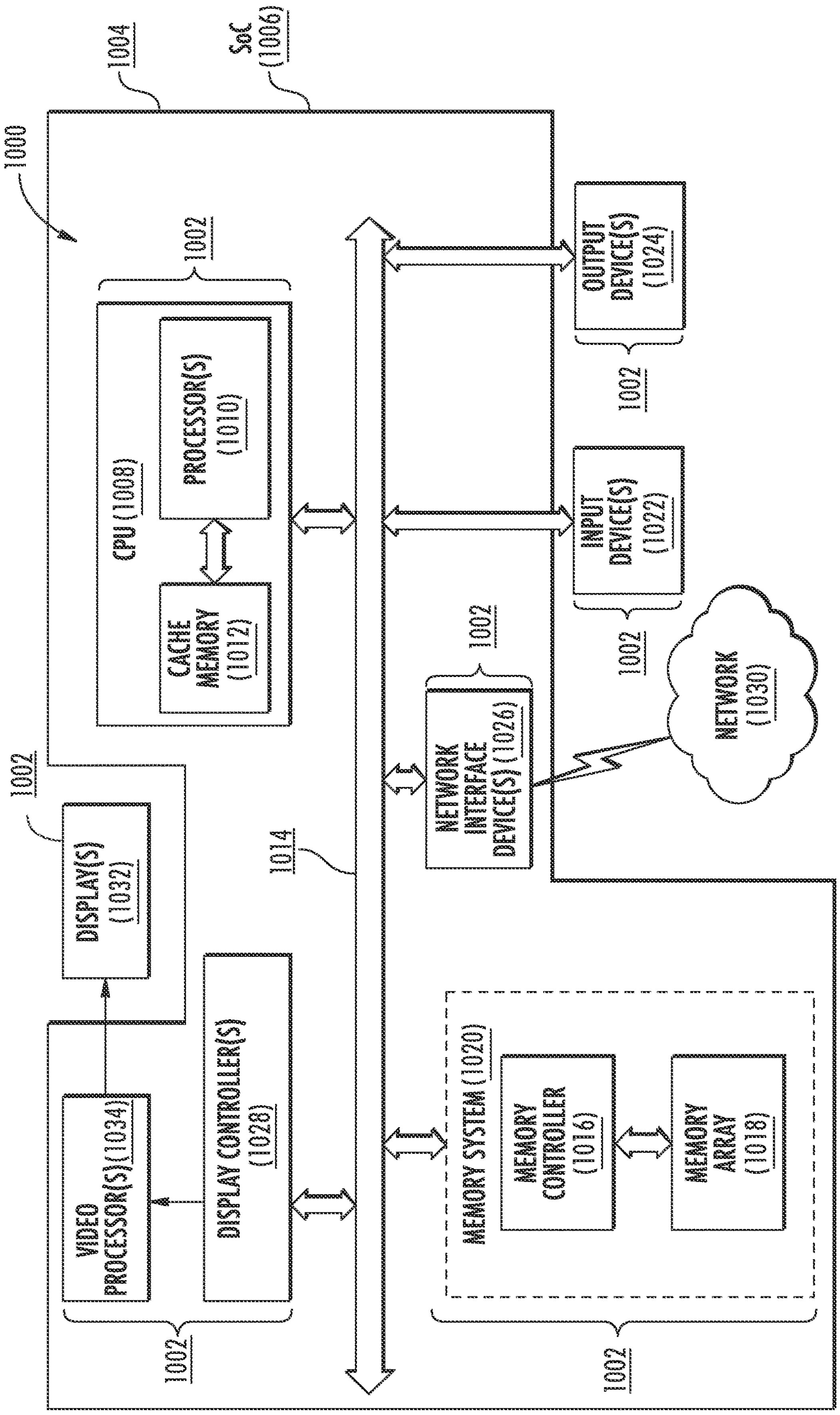
FIG. 10 is a block diagram of an exemplary processor-based system that includes a multi-directional antenna module that includes a first antenna coupled in a first orientation to the package substrate to have a first antenna radiation pattern in a first direction with respect to the package substrate, and a second antenna whose antenna package, as coupled to the package substrate, enforces a second orientation of the second antenna to provide second antenna radiation pattern in a second direction orthogonal to the first direction to support multi-directional antenna radiation patterns, including, but not limited to, the multi-directional antenna modules in FIGS. 2A-3B, 5 and 8A-8D, and according to any of the fabrication processes in FIGS. 6 and 7.

FIG. 10 illustrates an example of a processor-based system 1000. The components of the processor-based system 1000 are ICs 1002. Some or all of the ICs 1002 in the processor-based system 1000 can include a multi-directional antenna module 1004 that includes a first antenna coupled in a first orientation to the package substrate to have a first antenna radiation pattern in a first direction with respect to the package substrate, and a second antenna whose antenna package, as coupled to the package substrate, enforces a second orientation of the second antenna to provide second antenna radiation pattern in a second direction orthogonal to the first direction to support multi-directional antenna radiation patterns, including, but not limited to, the multi-directional antenna modules in FIGS. 2-3B, 5, and 8A-8D, and according to any of the fabrication processes in FIGS. 6-7. In this example, the processor-based system 1000 may be formed as a system-on-a-chip (SoC) 1006 that includes the multi-directional antenna module 1004. The processor-based system 1000 includes a CPU 1008 that includes one or more processors 1010, which may also be referred to as CPU cores or processor cores. The CPU 1008 may have cache memory 1012 coupled to the CPU 1008 for rapid access to temporarily stored data. The CPU 1008 is coupled to a system bus 1014 and can intercouple master and slave devices included in the processor-based system 1000. As is well known, the CPU 1008 communicates with these other devices by exchanging address, control, and data information over the system bus 1014. For example, the CPU 1008 can communicate bus transaction requests to a memory controller 1016 as an example of a slave device. Although not illustrated in FIG. 10, multiple system buses 1014 could be provided, wherein each system bus 1014 constitutes a different fabric.

Other master and slave devices can be connected to the system bus 1014. As illustrated in FIG. 10, these devices can include a memory system 1020 that includes the memory controller 1016 and a memory arrays) 1018, one or more input devices 1022, one or more output devices 1024, one or more network interface devices 1026, and one or more display controllers 1028, as examples. Each of the memory systems 1020, the one or more input devices 1022, the one or more output devices 1024, the one or more network interface devices 1026, and the one or more display controllers 1028 can be provided in the same or different IC packages. The input device(s) 1022 can include any type of input device, including, but not limited to, input keys, switches, voice processors, etc. The output device(s) 1024 can include any type of output device, including, but not limited to, audio, video, other visual indicators, etc. The network interface device(s) 1026 can be any device configured to allow exchange of data to and from a network 1030. The network 1030 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1026 can be configured to support any type of communications protocol desired.

The CPU 1008 may also be configured to access the display controller(s) 1028 over the system bus 1014 to control information sent to one or more displays 1032. The display controller(s) 1028 sends information to the display(s) 1032 to be displayed via one or more video processors 1034, which processes the information to be displayed into a format suitable for the display(s) 1032. The display controller(s) 1028 and video processor(s) 1034 can be included the same or different IC packages, and in the same or different IC packages containing the CPU 1008 as an example. The display(s) 1032 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read. Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered aspects/clauses:

1. An antenna module, comprising:

a package substrate disposed in a first plane, the package substrate comprising a plurality of metallization layers parallel to each other;

a first antenna comprising a first antenna package, comprising:

- a first antenna element disposed in a second plane parallel to the first plane; and
- a first external metal interconnect coupled to the first antenna element and at least one first metallization layer of the plurality of metallization layers;

a second antenna comprising a second antenna package, comprising:

- a second antenna element disposed in a third plane orthogonal to the second plane; and
- a second external metal interconnect coupled to the second antenna element and at least one second metallization layer of the plurality of metallization layers; and a radio-frequency integrated circuit (RFIC) package coupled to the at least one first metallization layer and the at least one second metallization layer to electrically couple the RFIC to the first antenna element and the second antenna element.

2. The antenna module of clause 1, wherein:

the first antenna element has a first radiation pattern configured to radiate a radio-frequency (RF) signal in a first direction orthogonal to the first plane; and the second antenna element has a second radiation pattern configured to radiate a signal in a second direction parallel to the first plane.

3. The antenna module of any of clauses 1 to 2, wherein:

the second antenna package further comprises an outer surface;

the second external metal interconnect comprises a metal pad disposed on the outer surface of the second antenna package; and further comprising a metal contact coupled to the metal pad and the at least one second metallization layer to couple the second antenna element to the RFIC.

4. The antenna module of clause 3, wherein the metal pad comprises a first metal portion that intersects the third plane of the second antenna element.

5. The antenna module of any of clauses 3 to 4, wherein:

the metal pad further comprises a second metal portion that extends in a direction orthogonal to the third plane of the second antenna element and does not intersect the third plane of the second antenna element; and the metal contact is coupled to the second metal portion of the metal pad to couple the second antenna element to the at least one second metallization layer.

6. The antenna module of any of clauses 1 to 2, wherein at least a portion of the second external metal interconnect intersects the third plane of the second antenna element.

7. The antenna module of any of clauses 1 to 7, wherein the second antenna element comprises a second metal patch.

8. The antenna module of clause 7, wherein the second antenna package further comprises:

an additional second antenna element disposed in a fourth plane parallel to the third plane of the second antenna element; and at least one dielectric layer disposed between the second antenna element and the additional second antenna element.

9. The antenna module of clause 8, wherein the additional second antenna element is configured to be electro-magnetically (EM) coupled to the second antenna element in response to the second antenna element radiating a radio-frequency (RF) signal received on the second external metal interconnect.

10. The antenna module of any of clauses 1 to 9, wherein the first antenna element comprises a first metal patch.

11. The antenna module of clause 10, wherein the first antenna package further comprises:

an additional first antenna element disposed in a fourth plane parallel to the second plane of the first antenna element; and at least one dielectric layer disposed between the first antenna element and the additional first antenna element.

12. The antenna module of any of clauses 10 to 11, wherein the first external metal interconnect comprises a solder bump.

13. The antenna module of any of clauses 1 to 12, wherein:

the plurality of metallization layers comprises:

- a first outer metallization layer disposed on a first side of the package substrate; and
- a second outer metallization layer disposed on a second side of the package substrate opposite of the first side;

the first external metal interconnect is coupled to the at least one first metallization layer by being coupled to the first outer metallization layer; and the second external metal interconnect is coupled to the at least one second metallization layer by being coupled to the second outer metallization layer.

14. The antenna module of any of clauses 1 to 12, wherein:

the plurality of metallization layers comprises:

a first outer metallization layer disposed on a first side of the package substrate;

a second outer metallization layer disposed on a second side of the package substrate opposite of the first side;

the first external metal interconnect is coupled to the at least one first metallization layer by being coupled to the first outer metallization layer; and the second external metal interconnect is coupled to the at least one second metallization layer by being coupled to the first outer metallization layer, 15. The antenna module of any of clauses 1 to 14 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SiP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multi copter, 16. A method of fabricating an antenna module with multiple antennas to provide multi-directional antenna radiation patterns, comprising:

providing a package substrate disposed in a first plane comprising forming a plurality of metallization layers parallel to each other;

providing a first antenna comprising providing a first antenna package comprising a first antenna element disposed in a second plane parallel to the first plane, and a first external metal interconnect coupled to the first antenna element;

coupling the first external metal interconnect to at least one first metallization layer of the plurality of metallization layers of the package substrate;

providing a second antenna comprising providing a second antenna package comprising a second antenna element disposed in a third plane orthogonal to the second plane, and a second external metal interconnect coupled to the second antenna element;

coupling the second external metal interconnect to at least one second metallization layer of the plurality of metallization layers of the package substrate; and coupling a radio-frequency integrated circuit (RFIC) package to the at least one first metallization layer and the at least one second metallization layer of the package substrate to electrically couple the RFIC to the first antenna element and the second antenna element.

17. The method of clause 16, wherein:

the second antenna package further comprises an outer surface;

the second external metal interconnect comprises a metal pad disposed on the outer surface of the second antenna package; and coupling the second external metal interconnect to the at least one second metallization layer comprises coupling a metal contact to the metal pad and the at least one second metallization layer to couple the second antenna element to the RFIC.

18. The method of clause 17, wherein:

the metal pad comprises a first metal portion that intersects the third plane of the second antenna element and a second metal portion that extends in a direction orthogonal to the third plane of the second antenna element and does not intersect the third plane of the second antenna element; and coupling the second external metal interconnect to the at least one second metallization layer comprises coupling the metal contact to the second metal portion of the metal pad and the at least one second metallization layer to couple the second antenna element to the RFIC, 19. The method of any of clauses 16 to 18, wherein the second antenna element comprises a second metal patch.

20. The method of clause 19, wherein providing the second antenna package further comprises providing an additional second antenna element disposed in a fourth plane parallel to the third plane of the second antenna element.

21. The method of clause 20, wherein providing the second antenna package further comprises providing at least one dielectric layer between the second antenna element and the additional second antenna element.

22. The method of any of clauses 16 to 21, wherein:

forming the plurality of metallization layers parallel to each other comprises:

forming a first outer metallization layer disposed on a first side of the package substrate; and forming a second outer metallization layer disposed on a second side of the package substrate opposite of the first side;

coupling the first external metal interconnect to the at least one first metallization layer comprises coupling the first external metal interconnect to the first outer metallization layer; and coupling the second external metal interconnect to the at least one first metallization layer comprises coupling the second external metal interconnect to the second outer metallization layer.

23. The method of any of clauses 16 to 21, wherein:

forming the plurality of metallization layers parallel to each other comprises:

forming a first outer metallization layer disposed on a first side of the package substrate; and forming a second outer metallization layer disposed on a second side of the package substrate opposite of the first side;

coupling the first external metal interconnect to the at least one first metallization layer comprises coupling the first external metal interconnect to the first outer metallization layer; and coupling the second external metal interconnect to the at least one first metallization layer comprises coupling the second external metal interconnect to the first outer metallization layer.

24. An electronic device, comprising:

a circuit board comprising a first side, a second side opposite the first side, a third side adjacent to the first side and the second side, and a fourth side adjacent to the first side and the second side and opposite the third side; and an antenna module, comprising:

a package substrate disposed in a first plane in a horizontal direction;

a first antenna disposed in a second plane parallel to the first plane; and a second antenna disposed in a third plane orthogonal to the second plane; and a radio-frequency integrated circuit (RFIC) package coupled to the package substrate to electrically couple the RFIC to the first antenna and the second antenna;

wherein:

the package substrate further comprises:

a first section coupled to the first side of the circuit board; and a second section extending in the horizontal direction beyond a vertical plane of the third side of the circuit board extending in a vertical direction orthogonal to the horizontal direction;

the first antenna is coupled to the first section of the package substrate; and the second antenna is coupled to the second section of the package substrate.

25. The electronic device of clause 24, wherein the second antenna is disposed adjacent to the third side of the circuit board.

26. The electronic device of any of clauses 24 to 25, wherein:

the package substrate comprises a plurality of metallization layers each extending in the horizontal direction and parallel to each other;

the first antenna comprises a first antenna package, comprising:

a first antenna element disposed in the second plane parallel to the first plane; and a first external metal interconnect coupled to the first antenna element;

the second antenna comprises a second antenna package, comprising:

a second antenna element disposed in the third plane orthogonal to the second plane; and a second external metal interconnect coupled to the second antenna element;

the first antenna is coupled to the first section of the package substrate by the first external metal interconnect being further coupled to at least one first metallization layer of the plurality of metallization layers in the first section of the package substrate;

the second antenna is coupled to the second section of the package substrate by the second external metal interconnect being further coupled to at least one second metallization layer of the plurality of metallization layers in the second section of the package substrate; and the RFIC package is coupled to the at least one first metallization layer and the at least one second metallization layer to electrically couple the RFIC to the first antenna element and the second antenna element.

27. The electronic device of clause 26, wherein:

the plurality of metallization layers comprises:

a first outer metallization layer disposed on the first side of the package substrate; and a second outer metallization layer disposed on the second side of the package substrate opposite of the first side;

the first external metal interconnect is coupled to the at least one first metallization layer by being coupled to the first outer metallization layer in the first section of the package substrate; and the second external metal interconnect is coupled to the at least one second metallization layer by being coupled to the second outer metallization layer in the first section of the package substrate.

28. The electronic device of clause 26, wherein:

the plurality of metallization layers comprises:

a first outer metallization layer disposed on the first side of the package substrate; and a second outer metallization layer disposed on the second side of the package substrate opposite of the first side;

the first external metal interconnect is coupled to the at least one first metallization layer by being coupled to the first outer metallization layer in the first section of the package substrate; and the second external metal interconnect is coupled to the at least one second metallization layer by being coupled to the first outer metallization layer in the first section of the package substrate.

What is claimed is:

1. An antenna module, comprising:

a package substrate disposed in a first plane, the package substrate comprising a first surface and a second surface opposite the first surface and a plurality of metallization layers between the first surface and the second surface, the plurality of metallization layers parallel to each other;

a first antenna comprising a first antenna package, comprising:

a first antenna element disposed in a second plane parallel to the first plane; and a first external metal interconnect coupled to the first antenna element and at least one first metallization layer of the plurality of metallization layers;

a second antenna comprising a second antenna package, comprising:

a second antenna element disposed in a third plane orthogonal to the second plane; and a second external metal interconnect coupled to the second antenna element and at least one second metallization layer of the plurality of metallization layers; and a radio-frequency integrated circuit (RFIC) package coupled to the at least one first metallization layer and the at least one second metallization layer to electrically couple the RFIC package to the first antenna element and the second antenna element;

wherein the first antenna is located on the first surface of the package substrate; and wherein the second antenna is located on the second surface of the package substrate.

2. The antenna module of claim 1, wherein:

the first antenna element has a first radiation pattern configured to radiate a radio-frequency (RF) signal in a first direction orthogonal to the first plane; and the second antenna element has a second radiation pattern configured to radiate a RF signal in a second direction parallel to the first plane.

3. The antenna module of claim 1, wherein:

the second antenna package further comprises an outer surface;

the second external metal interconnect comprises a metal pad disposed on the outer surface of the second antenna package; and further comprising a metal contact coupled to the metal pad and the at least one second metallization layer to couple the second antenna element to the RFIC package.

4. The antenna module of claim 3, wherein the metal pad comprises a first metal portion that intersects the third plane of the second antenna element.

5. The antenna module of claim 3, wherein:

the metal pad further comprises a second metal portion that extends in a direction orthogonal to the third plane of the second antenna element and does not intersect the third plane of the second antenna element; and the metal contact is coupled to the second metal portion of the metal pad to couple the second antenna element to the at least one second metallization layer.

6. The antenna module of claim 1, wherein at least a portion of the second external metal interconnect intersects the third plane of the second antenna element.

7. The antenna module of claim 1, wherein the second antenna element comprises a second metal patch.

8. The antenna module of claim 7, wherein the second antenna package further comprises:

an additional second antenna element disposed in a fourth plane parallel to the third plane of the second antenna element; and at least one dielectric layer disposed between the second antenna element and the additional second antenna element.

9. The antenna module of claim 8, wherein the additional second antenna element is configured to be electro-magnetically (EM) coupled to the second antenna element in response to the second antenna element radiating a radio-frequency (RF) signal received on the second external metal interconnect.

10. The antenna module of claim 1, wherein the first antenna element comprises a first metal patch.

11. The antenna module of claim 10, wherein the first antenna package further comprises:

an additional first antenna element disposed in a fourth plane parallel to the second plane of the first antenna element; and at least one dielectric layer disposed between the first antenna element and the additional first antenna element.

12. The antenna module of claim 10, wherein the first external metal interconnect comprises a solder bump.

13. The antenna module of claim 1, wherein:

the plurality of metallization layers comprises:

a first outer metallization layer disposed on a first side of the package substrate; and a second outer metallization layer disposed on a second side of the package substrate opposite the first side;

the first external metal interconnect is coupled to the at least one first metallization layer by being coupled to the first outer metallization layer; and the second external metal interconnect is coupled to the at least one second metallization layer by being coupled to the second outer metallization layer.

14. The antenna module of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SiP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

15. A method of fabricating an antenna module with multiple antennas to provide multi-directional antenna radiation patterns, comprising:

providing a package substrate disposed in a first plane comprising forming a plurality of metallization layers parallel to each other between a first surface of the package substate and a second surface of the package substate opposite the first surface;

providing a first antenna comprising providing a first antenna package comprising a first antenna element disposed in a second plane parallel to the first plane, and a first external metal interconnect coupled to the first antenna element;

coupling the first external metal interconnect to at least one first metallization layer of the plurality of metallization layers of the package substrate;

providing a second antenna comprising providing a second antenna package comprising a second antenna element disposed in a third plane orthogonal to the second plane, and a second external metal interconnect coupled to the second antenna element;

coupling the second external metal interconnect to at least one second metallization layer of the plurality of metallization layers of the package substrate; and coupling a radio-frequency integrated circuit (RFIC) package to the at least one first metallization layer and the at least one second metallization layer of the package substrate to electrically couple the RFIC package to the first antenna element and the second antenna element;

wherein the first antenna is located on the first surface of the package substrate; and wherein the second antenna is located on the second surface of the package substrate.

16. The method of claim 15, wherein:

the second antenna package further comprises an outer surface;

the second external metal interconnect comprises a metal pad disposed on the outer surface of the second antenna package; and coupling the second external metal interconnect to the at least one second metallization layer comprises coupling a metal contact to the metal pad and the at least one second metallization layer to couple the second antenna element to the RFIC package.

17. The method of claim 16, wherein:

the metal pad comprises a first metal portion that intersects the third plane of the second antenna element and a second metal portion that extends in a direction orthogonal to the third plane of the second antenna element and does not intersect the third plane of the second antenna element; and coupling the second external metal interconnect to the at least one second metallization layer comprises coupling the metal contact to the second metal portion of the metal pad and the at least one second metallization layer to couple the second antenna element to the RFIC package.

18. The method of claim 15, wherein the second antenna element comprises a second metal patch.

19. The method of claim 18, wherein providing the second antenna package further comprises providing an additional second antenna element disposed in a fourth plane parallel to the third plane of the second antenna element.

20. The method of claim 19, wherein providing the second antenna package further comprises providing at least one dielectric layer between the second antenna element and the additional second antenna element.

21. The method of claim 15, wherein:

forming the plurality of metallization layers parallel to each other comprises:

forming a first outer metallization layer disposed on a first side of the package substrate; and forming a second outer metallization layer disposed on a second side of the package substrate opposite the first side;

coupling the first external metal interconnect to the at least one first metallization layer comprises coupling the first external metal interconnect to the first outer metallization layer; and coupling the second external metal interconnect to the at least one second metallization layer comprises coupling the second external metal interconnect to the second outer metallization layer.

* * * * *